(12) United States Patent
Nakajima et al.

(10) Patent No.: US 10,761,794 B2
(45) Date of Patent: Sep. 1, 2020

(54) IMAGE PROCESSING APPARATUS AND PROGRAM

(71) Applicant: KONICA MINOLTA, INC., Chiyoda-ku, Tokyo (JP)

(72) Inventors: Hozuma Nakajima, Toyokawa (JP); Kazuaki Tomono, Okazaki (JP); Kenzo Yamamoto, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/007,184

(22) Filed: Jun. 13, 2018

(65) Prior Publication Data

US 2018/0373479 A1   Dec. 27, 2018

(30) Foreign Application Priority Data

Jun. 22, 2017 (JP) ................... 2017-121968

(51) Int. Cl.
  *G06F 3/12* (2006.01)
  *G06F 3/0481* (2013.01)
(52) U.S. Cl.
  CPC ........ *G06F 3/1247* (2013.01); *G06F 3/04817* (2013.01); *G06F 3/1206* (2013.01); *G06F 3/1207* (2013.01); *G06F 3/1259* (2013.01); *G06F 3/1271* (2013.01); *G06F 3/1292* (2013.01)
(58) Field of Classification Search
  CPC .. G06F 3/1247; G06F 3/04817; G06F 3/1206; G06F 3/1207; G06F 3/1259; G06F 3/0482; G06F 3/0488; H04M 2250/22
  See application file for complete search history.

(56) References Cited

U.S. PATENT DOCUMENTS

2007/0264976 A1*  11/2007  Lessing ................. H04W 88/06
                                                       455/414.1
2015/0143299 A1*  5/2015  Kim ...................... G06F 3/0482
                                                       715/835

FOREIGN PATENT DOCUMENTS

JP       2006350634      * 12/2006
JP       2012-519442 A     8/2012

OTHER PUBLICATIONS

English machine translation of JP2006350634 (Year: 2006).*

* cited by examiner

*Primary Examiner* — Iriana Cruz
(74) *Attorney, Agent, or Firm* — Buchanan Ingersoll & Rooney PC

(57) ABSTRACT

An image processing apparatus capable of performing image processing by communicating with a remote terminal includes: a communication part that communicates with the remote terminal; a display part; and a hardware processor that: is capable of obtaining a file having a format corresponding to a first icon image, the file being a file as an image processing target; is capable of performing image processing involving file format conversion of the obtained file; obtains a second icon image corresponding to a format of a file after undergoing processing generated by the image processing, from the remote terminal; and causes the display part to display the second icon image obtained by the hardware processor, for the file after undergoing processing.

22 Claims, 16 Drawing Sheets

7

| TYPE | FILE FORMAT OF FILE BEFORE UNDERGOING PROCESSING | FILE FORMAT OF FILE AFTER UNDERGOING PROCESSING |
|---|---|---|
| IMAGE PROCESSING A | TIFF | JPEG, PNG, PDF |
| IMAGE PROCESSING B | PDF | DOC |
| IMAGE PROCESSING C | PDF | DOC, XML, JPEG |
| IMAGE PROCESSING D | JPEG | BMP, TIFF |
| IMAGE PROCESSING E | XML | JPEG, TIFF, PDF |
| IMAGE PROCESSING F | DOC | JPEG, TIFF, PDF |

IMAGE PROCESSING APPARATUS AND PROGRAM

The entire disclosure of Japanese patent Application No. 2017-121968, filed on Jun. 22, 2017, is incorporated herein by reference in its entirety.

BACKGROUND

Technological Field

The present invention relates to an image processing apparatus and a program, and particularly relates to an image processing apparatus operable in cooperation with a remote terminal.

Description of the Related Art

Conventionally, there is a known technique capable of performing file transfer of transferring a file from one mobile terminal to another mobile terminal in a state where the two mobile terminals are arranged side by side, by dragging and moving an icon image of a file on one mobile terminal to the other mobile terminal and dropping the image on the other terminal (for example, JP 2012-519442 A). According to this conventional technique, an icon image dragged from one mobile terminal can be displayed also on the other mobile terminal.

Meanwhile, an image processing apparatus such as multifunction peripherals (MFP) is capable of communicating with a remote terminal such as a mobile terminal so as to obtain a file from the remote terminal and perform image processing on the file. An image processing apparatus performs various types of processing, for example, image processing involving file format conversion such as conversion from a PDF file into a DOC file.

In a case where image processing involving file format conversion is selected by a user, the image processing apparatus as described above displays, on an operation panel operated by the user, both an icon image corresponding to a format of a file before undergoing processing as an image processing target and an icon image corresponding to a format of a file to be generated by the image processing so as to indicate the user how the file format is to be converted by the image processing. At this time, the image processing apparatus reads out an icon image corresponding to the format of the file before undergoing processing and an icon image corresponding to the format of the file to be generated by the image processing from among a plurality of icon images corresponding to various file formats stored in the image processing apparatus, and displays the icon images.

Unfortunately, however, the icon image stored in the image processing apparatus might have a different look-and-feel from the icon image displayed on the remote terminal the user is familiar with. Therefore, displaying, by the image processing apparatus, the icon images corresponding to the file before and after undergoing image processing using the icon image stored in the image processing apparatus might cause the user to feel strange.

In order to prevent this, it is desirable to unify the icon image displayed on the operation panel of the image processing apparatus with the icon image displayed on the remote terminal. For example, with application of the conventional technique of JP 2012-519442 A, the image processing apparatus can obtain from the remote terminal the icon image corresponding to the format of the file dragged by the user and can display the icon image. However, since the image processing apparatus cannot grasp beforehand the format of the file to be generated by image processing, and thus, cannot obtain from the remote terminal the icon image corresponding to the format of the file to be generated by the image processing and display the icon image. This causes a problem of the conventional image processing apparatus having difficulty to achieve conformity in the look-and-feel of the icon image corresponding to the format of the file generated by the image processing with the icon image displayed on the remote terminal.

SUMMARY

The present invention has been made to solve the above-described conventional problem, and an object thereof is to provide an image processing apparatus and a program capable of achieving conformity in the look-and-feel of an icon image indicating a file generated by image processing involving file format conversion with the icon image displayed on a remote terminal.

To achieve the abovementioned object, according to an aspect of the present invention, an image processing apparatus capable of performing image processing by communicating with a remote terminal, reflecting one aspect of the present invention comprises a communication part that communicates with the remote terminal; a display part; and a hardware processor that: is capable of obtaining a file having a format corresponding to a first icon image, the file being a file as an image processing target; is capable of performing image processing involving file format conversion of the obtained file; obtains a second icon image corresponding to a format of a file after undergoing processing generated by the image processing, from the remote terminal; and causes the display part to display the second icon image obtained by the hardware processor, for the file after undergoing processing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
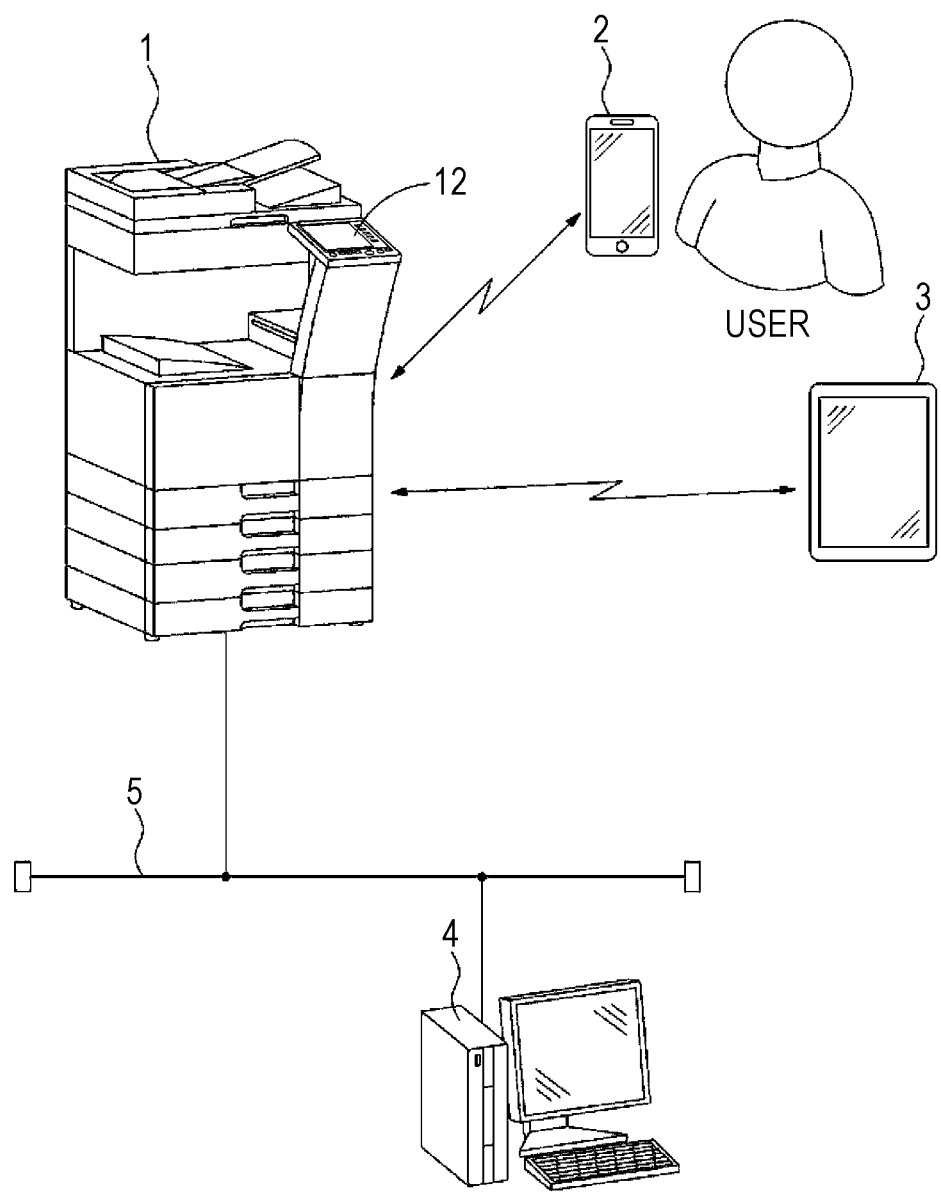
FIG. 1 is a diagram illustrating an exemplary configuration of an image processing system.

Hereinafter, one or more embodiments of the present invention will be described in detail with reference to the drawings. However, the scope of the invention is not limited to the disclosed embodiments. In the embodiments described below, same reference numerals are given to members used in common by each of the embodiments, and redundant description will be omitted.

First Embodiment

FIG. 1 is a diagram illustrating an exemplary configuration of an image processing system according to a first embodiment of the present invention. This image processing system has a configuration enabling communication between an image processing apparatus 1 provided as an MFP, or the like, and remote terminals 2, 3, and 4. Examples of the remote terminal 2 include a smart phone or a tablet terminal possessed by a user, enabling wireless communication with the image processing apparatus 1 via short-range wireless communication, or the like. Example of the remote terminal 3 include a tablet terminal or a smartphone possessed by a user, and as with the remote terminal 2, also enabling wireless communicate with the image processing apparatus 1 via short-range wireless communication or the like. The remote terminal 4 is a personal computer (PC), for example, and is capable of communicating with the image processing apparatus 1 via a network 5 such as a local area network (LAN). Incidentally, the remote terminals 2, 3, and 4 are illustrative, and thus, any of these is not limited to smart phones, tablet terminals, or PCs.

The image processing apparatus 1 has various image processing functions in addition to a copy function, a scan function, and a print function. That is, the image processing apparatus 1 can execute a plurality of types of image processing, and executes image processing designated by a user from among the plurality of types of image processing. The plurality of types of image processing includes image processing involving file format conversion. Therefore, when the user selects image processing involving file format conversion, the image processing apparatus 1 converts the format of a file before undergoing processing as an image processing target so as to generate a file of a format different from the format before undergoing processing. For example, image processing performed by the image processing apparatus 1 includes generation of a DOC file from a PDF file.

For example, the image processing apparatus 1 can obtain a file as an image processing target from each of the remote terminals 2, 3, and 4, perform image processing on the file to generate a file having a different file format. The image processing apparatus 1 includes an operation panel 12 as a user interface and displays, on the operation panel 12, a screen for receiving setting operation from the user in execution of operation in cooperation with the remote terminals 2, 3, and 4. That is, the image processing apparatus 1 communicates with the remote terminals 2, 3, and 4, displays on the operation panel 12 a list of files stored in the remote terminals 2, 3, and 4, and receives file selection operation by the user. The image processing apparatus 1 further receives image processing selection operation performed on the operation panel 12, and displays on the operation panel 12 an icon image (second icon image) corresponding to the file format in order to allow the user to grasp the format of the file to be generated by the image processing. At this time, the image processing apparatus 1 displays the icon image corresponding to the file generated by image processing, using icon image data corresponding to the icon image obtained from the remote terminals 2, 3, and 4. This allows the user to confirm the file format with the same icon image as the remote terminals 2, 3, and 4 that is normally used.

Hereinafter, the image processing apparatus 1 will be described in more detail. In the following present embodiment, a case where the image processing apparatus 1 cooperates with the remote terminal 2 will be mainly exemplified.

Figure 2:
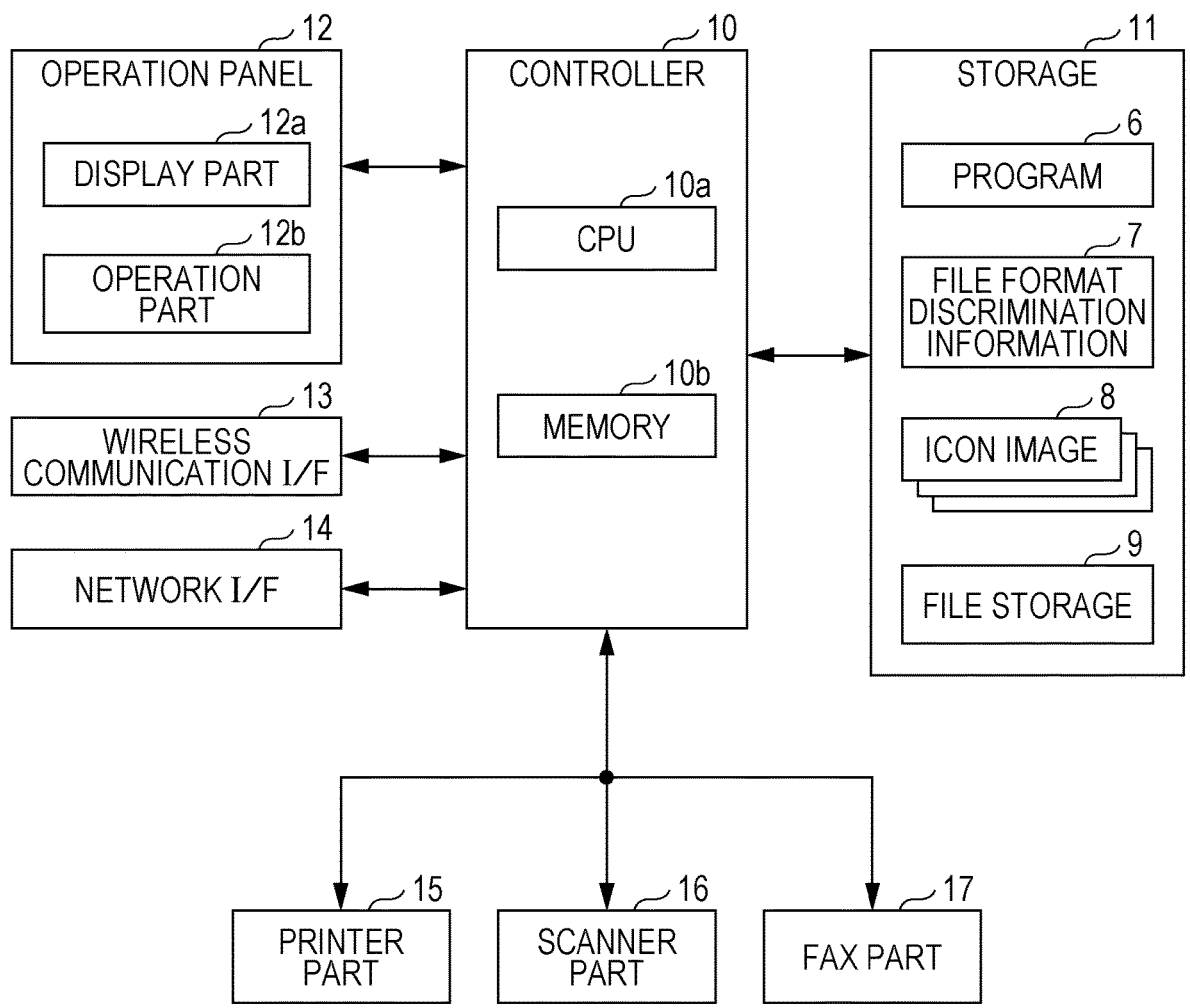
FIG. 2 is a block diagram illustrating an exemplary hardware configuration of an image processing apparatus.

FIG. 2 is a block diagram illustrating an exemplary hardware configuration of the image processing apparatus 1. As illustrated in FIG. 2, the image processing apparatus 1 includes a controller 10, a storage 11, the operation panel 12, a wireless communication interface 13, a network interface 14, a printer part 15, a scanner part 16, and a FAX part 17.

The controller 10 includes a CPU 10a and a memory 10b. The CPU 10a is an arithmetic processing unit that reads out and executes a program 6 stored in the storage 11. The memory 10b is provided to store temporary data generated in execution of processing based on the program 6 by the CPU 10a. The execution of the program 6 by the CPU 10a allows the controller 10 to function as a processor to execute various types of processing to be described below so as to control operation of individual components.

The storage 11 is a nonvolatile storage device including a hard disk drive (HDD), for example. The storage 11 stores beforehand the program 6 to be executed by the CPU 10a of the controller 10. The storage 11 stores beforehand file format discrimination information 7 associating image processing executable by the image processing apparatus 1 with a file format. Details of the file format discrimination information 7 will be described below. The storage 11 also stores beforehand a plurality of types of icon images 8 corresponding to file formats of files that can be processing targets of the image processing apparatus 1. The icon images 8 are images different from the icon images held in the remote terminals 2, 3, and 4. The storage 11 further includes a file storage 9. The file storage 9 is a storage region for storing files designated by the user and can store a file before undergoing processing as an image processing target, a file generated by image processing, or the like.

The operation panel 12 includes a display part 12a and an operation part 12b. The display part 12a is a color liquid crystal display, for example, and displays various screens that can be operated by the user. The operation part 12b includes, for example, a touch screen sensor arranged on a display screen of the display part 12a, and receives user's operation.

The wireless communication interface 13 is provided to establish a wireless communication state with the remote terminals 2 and 3 and to perform wireless communication with the remote terminals 2 and 3. The wireless communication interface 13 can also establish a communication state simultaneously with each of a plurality of remote terminals 2 and 3, for example.

The network interface 14 is provided to connect the image processing apparatus 1 to a network such as a LAN. For example, the controller 10 can communicate with the remote terminal 4 via the network interface 14.

The printer part 15 performs print output on the basis of input image data. The scanner part 16 optically reads a document set by a user to generate image data. The FAX part 17 transmits and receives FAX data via a public telephone line (not illustrated).

Figure 3:
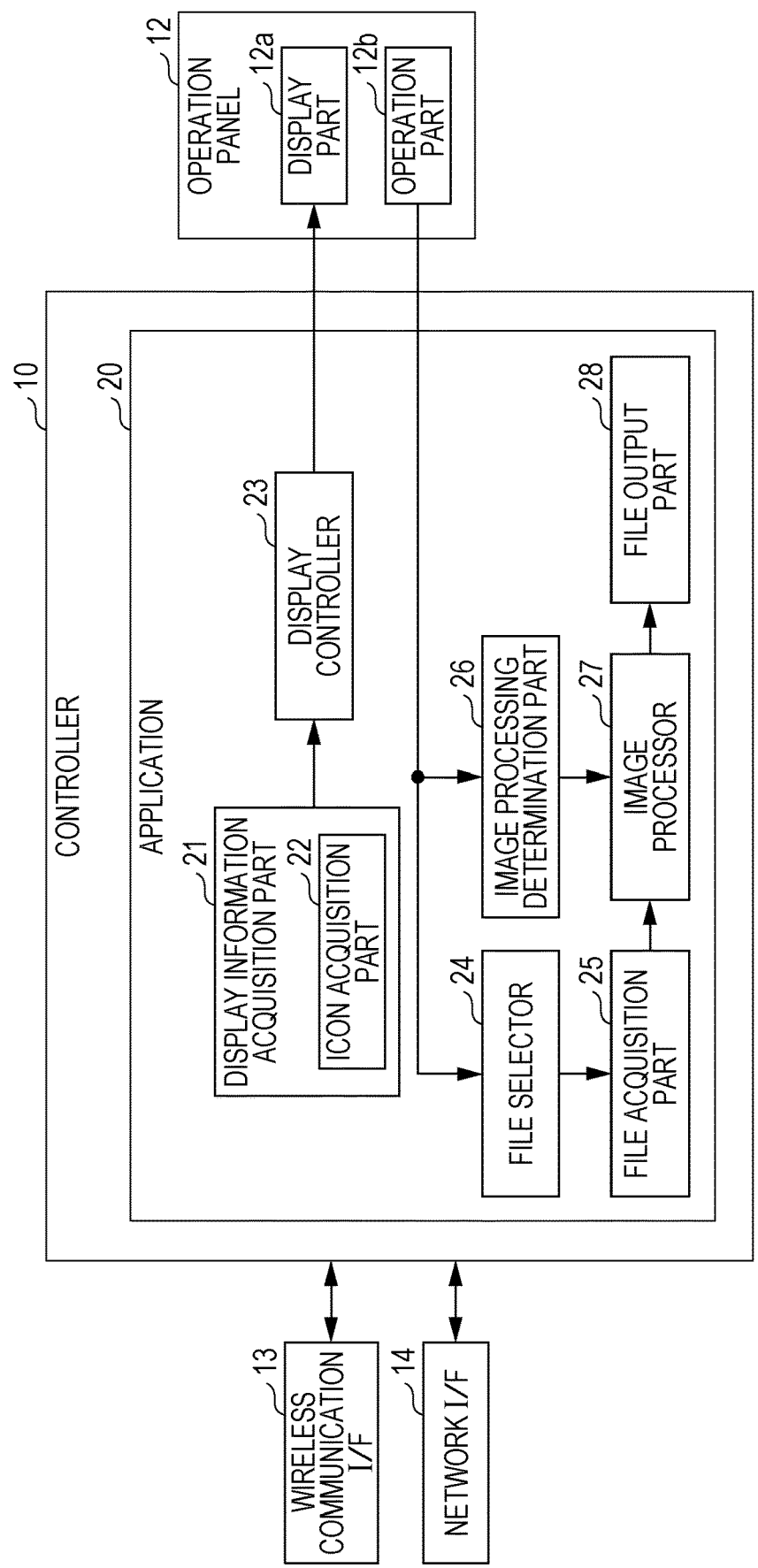
FIG. 3 is a block diagram illustrating a functional configuration of a controller.

Next, a functional configuration of the controller 10 will be described. FIG. 3 is a block diagram illustrating a functional configuration of the controller 10. Execution of the program 6 by the CPU 10a allows the controller 10 to activate an application 20 cooperating with the remote terminal 2. The application 20 monitors the wireless communication interface 13, for example, and establishes a communication state with the remote terminal 2 when it receives a communication request from the remote terminal 2. When the communication state with the remote terminal 2 is established, the controller 10 activates each of a display information acquisition part 21, a display controller 23, a file selector 24, a file acquisition part 25, an image processing determination part 26, an image processor 27, and a file output part 28, so as to start cooperative operation with the remote terminal 2. The communication with the remote terminal 2 is not limited to wireless communication, and communication via the network 5 such as LAN may be used.

The display information acquisition part 21 obtains information to be displayed on the display part 12a of the operation panel 12 from the remote terminal 2 of the communication partner. For example, the display information acquisition part 21 obtains screen information of a screen displayed on the remote terminal 2. When the screen information is obtained from the remote terminal 2, the display information acquisition part 21 outputs the screen information to the display controller 23.

The icon acquisition part 22 obtains an icon image for displaying a file, held by the remote terminal 2 of the communication partner. For example, the icon acquisition part 22 obtains all the icon images held by the remote terminal 2. Note that the present invention is not limited to this, and the icon acquisition part 22 may obtain an icon image corresponding to the file format before and after undergoing image processing. When the icon image is obtained from the remote terminal 2, the icon acquisition part 22 outputs the obtained icon image to the display controller 23.

The display controller 23 controls an image to be displayed on the display part 12a of the operation panel 12. For example, after the cooperative operation between the image processing apparatus 1 and the remote terminal 2 is started, the display controller 23 controls to display a setting screen for receiving user setting operation, on the display part 12a.

The setting screen is, for example, a screen divided into three display regions. The display controller 23 controls to display a display screen of the remote terminal 2 based on the screen information obtained by the display information acquisition part 21, in one display region of the setting screen. In addition, the display controller 23 controls to display a screen for selecting image processing desired by the user from among a plurality of types of image processing, in another display region of the setting screen. Furthermore, in a case where the image processing selected by the user is processing of converting the file format, the display controller 23 controls to display, in the remaining one display region, an icon image (first icon image) corresponding to the format of the file before undergoing image processing an icon image (second icon image) corresponding to the format of the file after undergoing image processing. When displaying the icon image corresponding to the file format before and after undergoing image processing, the display controller 23 in principle displays it using the icon image obtained from the remote terminal 2 by the icon acquisition part 22.

The file selector 24 is a processor that selects a file as an image processing target on the basis of user's operation performed on the operation part 12b. For example, in a case where the display screen of the remote terminal 2 displayed in one display region of the setting screen is a file list screen, the file selector 24 selects a file as an image processing target file from among a plurality of files displayed on the file list on the basis of the user's operation toward the region. Then, the file selector 24 notifies the file acquisition part 25 of the file selected by the user.

The file acquisition part 25 is a processor that obtains the file selected by the file selector 24. For example, in a case where a file stored in the remote terminal 2 is selected by the user as a processing target, the file acquisition part 25 transmits a file request to the remote terminal 2 via the wireless communication interface 13, and obtains the file designated by the user from the remote terminal 2. The file acquisition part 25 obtains the file designated by the user, and then, outputs the file to the image processor 27.

The image processing determination part 26 is a processor that determines image processing to be performed by the image processing apparatus 1 on the basis of the user's operation performed on the operation part 12b. For example, in a case where the user has performed operation of selecting one type of image processing on the screen for selecting image processing included in the setting screen, the image processing determination part 26 determines image processing to be performed by the image processing apparatus 1 on the basis of the user's operation. Then, the image processing determination part 26 notifies the image processor 27 of the determined image processing.

Moreover, with operation by the user of dragging an icon image of the file displayed as the file list screen of the remote terminal 2 to the inside of a screen for selecting image processing and dropping the image on a button image (icon image) corresponding to the desired image processing, the user can perform both file selection and image processing selection as a series of operation. In this case, the file selector 24 and the image processing determination part 26 are activated almost simultaneously, and processing target file selection processing and image processing determination processing are performed almost substantially.

The image processor 27 executes the image processing determined by the image processing determination part 26 onto the file obtained by the file acquisition part 25, so as to generate a new file reflecting the image processing. For example, in a case where the image processing designated by the user is image processing of converting the file format, the image processor 27 executes the image processing designated by the user, so as to generate a new file with a file format different from a processing target file. Then, the image processor 27 outputs the file generated by executing the image processing to the file output part 28.

The file output part 28 is a processor that outputs the file generated by the image processor 27 to an output destination designated by the user. For example, in a case where the remote terminal 2 is designated as the output destination of the file after undergoing image processing, the file output part 28 transmits the file after undergoing image processing to the remote terminal 2 via the wireless communication interface 13. Moreover, in a case where another remote terminal 3 or 4 is designated as an output destination of the file after undergoing image processing, the file output part 28 transmits the file after undergoing image processing to another remote terminal 3 and 4 via the wireless communication interface 13 or the network interface 14. Furthermore, in a case where the file storage 9 of the storage 11 is designated as the output destination of the file after undergoing image processing, the file output part 28 stores the file after undergoing image processing in the file storage 9 of the storage 11.

Figure 4:
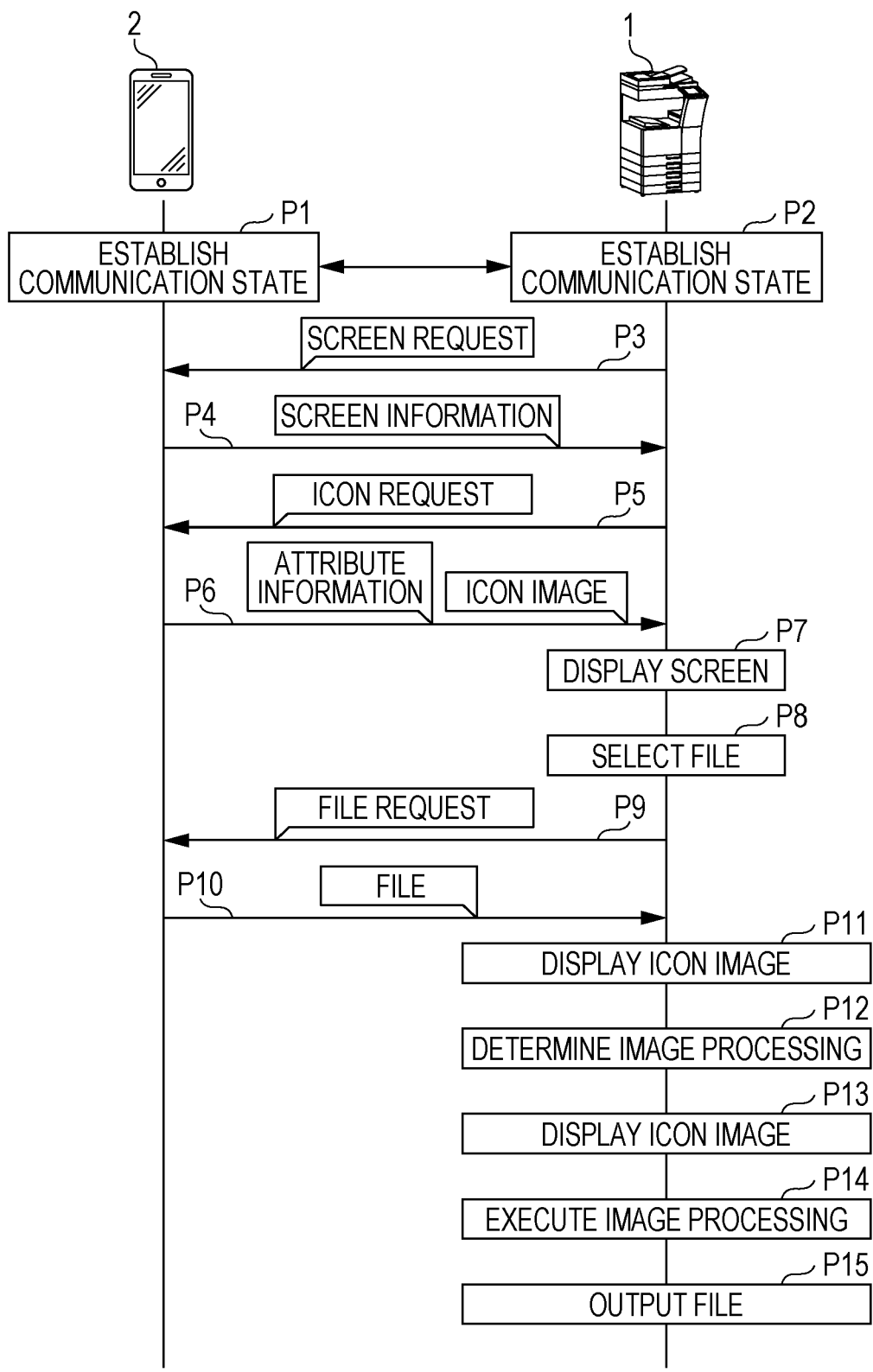
FIG. 4 is a diagram illustrating exemplary operation in which an image processing apparatus and a remote terminal cooperate with each other in a first embodiment.

FIG. 4 is a diagram illustrating exemplary operation in which the image processing apparatus 1 and the remote terminal 2 cooperate with each other. First, after an application cooperating with the image processing apparatus 1 is started in the remote terminal 2, the remote terminal 2 transmits a communication request to the image processing apparatus 1 to establish a communication state with the image processing apparatus 1 (process P1). Together with this, the image processing apparatus 1 also establishes a communication state with the remote terminal 2 (process P2).

After establishing the communication state with the remote terminal 2, the image processing apparatus 1 activates the display information acquisition part 21, transmits a screen request to the remote terminal 2 (process P3), and then obtains screen information of a display screen displayed on the remote terminal 2 (process P4).

Subsequently, the image processing apparatus 1 activates the icon acquisition part 22, transmits an icon request for requesting transmission of all icon images to the remote terminal 2 (process P5), and obtains all the icon images for file display, held in the remote terminal 2 (process P6). Note that, even when the image processing apparatus 1 simultaneously obtained a plurality of icon images from the remote terminal 2, the apparatus has difficulty in grasping to which file format each of the plurality of icon images corresponds. To cope with this, the icon acquisition part 22 requests for addition of attribute information of each of icon images in transmitting the icon request to the remote terminal 2. With this configuration, the icon acquisition part 22 can obtain all of the plurality of icon images held by the remote terminal 2, and can simultaneously obtain attribute information indicating in which file format each of the icon images is to be displayed. The icon acquisition part 22 obtains the icon images and the attribute information from the remote terminal 2, and then, temporarily stores them in the memory 10b.

Figure 5:
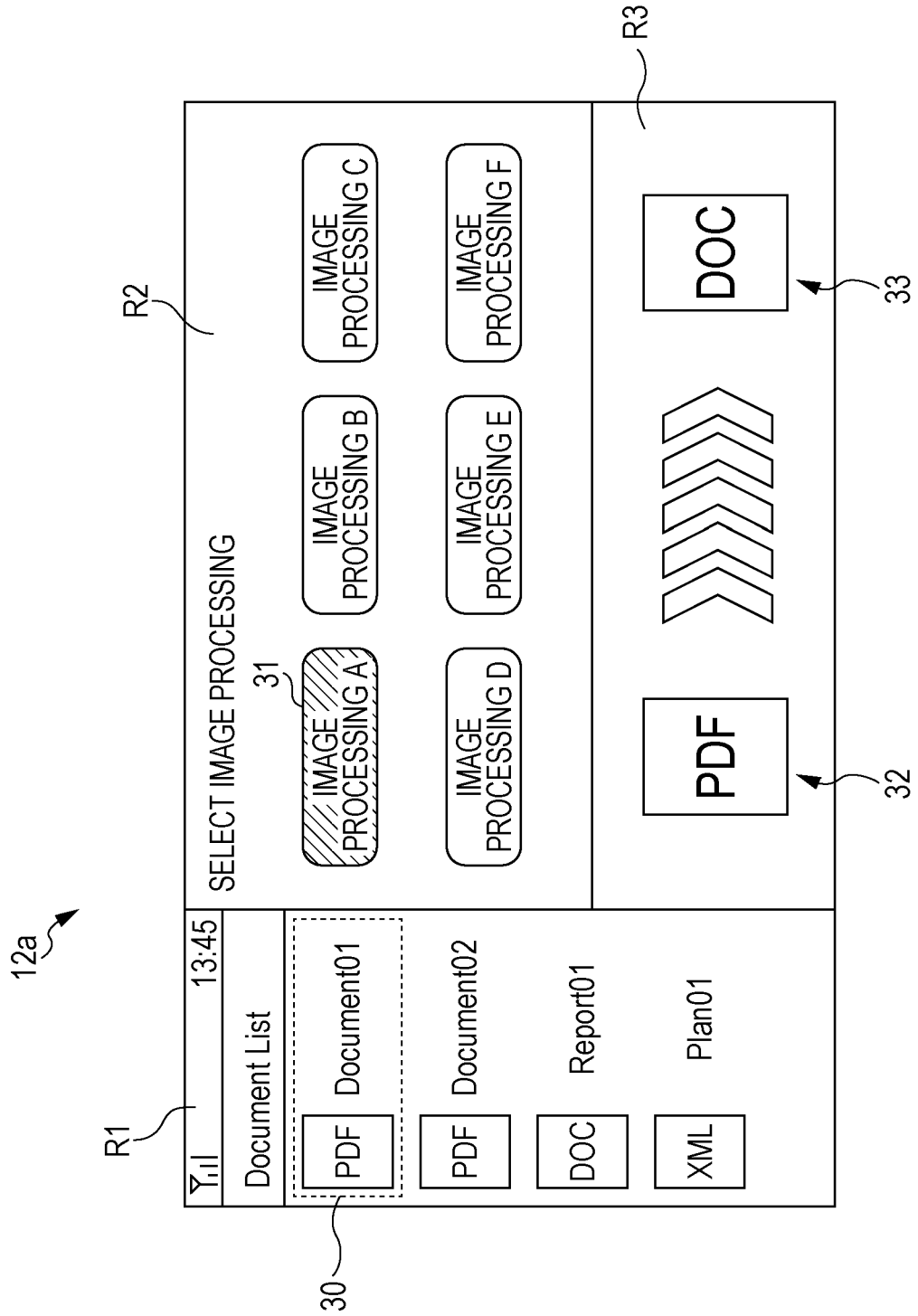
FIG. 5 is a diagram illustrating an exemplary setting screen displayed on the image processing apparatus.

Next, the image processing apparatus 1 activates the display controller 23 to display a setting screen for setting image processing to be performed in cooperation with the remote terminal 2, on the display part 12a of the operation panel 12 (process P7). FIG. 5 is a diagram illustrating an exemplary setting screen displayed on the image processing apparatus 1. As illustrated in FIG. 5, the setting screen has three display regions R1, R2, and R3. The display region R1 is a region for displaying a screen based on the screen information obtained from the remote terminal 2. In the example of FIG. 5, a list of files held in the remote terminal 2 is displayed in the display region R1. The display region R2 displays a screen on which a user can select desired image processing among a plurality of types of image processing executable in the image processing apparatus 1. The display region R3 is a display region that displays an icon image 32 corresponding to the format of the file before undergoing the image processing and an icon image 33 corresponding to the format of the file generated by the image processing, so as to indicate the user how file formats are converted by image processing. Note that the icon image 32 is not displayed when a file as an image processing target is not selected by the user, and that the icon image 33 is not displayed when image processing is not selected by the user.

The image processing apparatus 1 first displays a setting screen as illustrated in FIG. 5 on the operation panel 12, and thereafter receives file selection operation by the user (process P8). When the file selection operation by the user is performed, the file selector 24 is activated in the controller 10. Then, the file selector 24 instructs the file acquisition part 25 to select a file selected by the user, as an acquisition target file. Then, the file acquisition part 25 transmits a file request designating one file to the remote terminal 2 (process P9), and then obtains a file to be an image processing target from the remote terminal 2 (process P10). The file acquisition part 25 obtains the file from the remote terminal 2, specifies the format of the file, and notifies the display controller 23 of the file format. This allows the display controller 23 to grasp the format of the file as an image processing target. Accordingly, with determination of the format of the file as the image processing target, the display controller 23 specifies an icon image corresponding to the file format among a plurality of icon images obtained from the remote terminal 2, on the basis of the attribute information obtained from the remote terminal 2. Then, the display controller 23 displays the specified icon image as the icon image 32 corresponding to the format of the file before undergoing image processing, in the display region R3 (process P11). With this processing, when the file as the image processing target is designated by the user, the icon image 32 indicating the format of the file before undergoing processing, as the image processing target, is to be displayed in the display region R3, by an image same as the icon image displayed on the remote terminal 2.

Next, the image processing apparatus 1 receives image processing selection operation by the user. For example, the display region R2 of the setting screen illustrated in FIG. 5 displays a plurality of button images corresponding to each of a plurality of types of image processing. The user can select one type of image processing by performing touch operation or drag operation out of drag-and-drop on one button image among a plurality of button images. The image processing apparatus 1 receives the image processing selection operation by the user, activates the image processing determination part 26 to determine the image processing on the basis of the user's selection operation (process P12). Then, image processing is instructed from the image processing determination part 26 to the image processor 27. The image processing determination part 26 determines image processing, specifies a format of the file to be generated by the image processing, and notifies the display controller 23 of the specified file format. Thus, the display controller 23 can grasp the format of the file to be generated by the image processing. Accordingly, with determination of the format of the file generated by the image processing, the display controller 23 specifies an icon image corresponding to the file format among a plurality of icon images obtained from the remote terminal 2, on the basis of the attribute information obtained from the remote terminal 2. Then, the display controller 23 displays the specified icon image as the icon image 33 corresponding to the format of the file after undergoing image processing, in the display region R3 (process P13). With this processing, when the image processing is selected by the user, the icon image 33 indicating the format of the file after undergoing image processing is to be displayed in the display region R3, with an image same as the icon image displayed on the remote terminal 2.

Subsequently, the image processing apparatus 1 activates the image processor 27 to execute image processing on the file as an image processing target to generate a new file (process P14). Thereafter, the image processing apparatus 1 activates the file output part 28 to output the file generated by the image processing to an output destination designated by the user (process P15).

As described above, the image processing apparatus 1 performs cooperative operation with the remote terminal 2 to enable displaying an icon image same as the icon image displayed on the remote terminal 2 when displaying the icon images 32 and 33 corresponding to the file formats before and after undergoing image processing, leading to suppression of giving a strange feeling to the user. In particular, it is possible to display the icon image 33 corresponding to the file format after undergoing the image processing with the look-and-feel unified to the icon image displayed on the remote terminal 2, enabling the user to confirm the file format with the look-and-feel of the familiar icon image, leading to an advantage of enabling the user to easily grasp that the file generated by the image processing is a desired file format.

Figure 6:
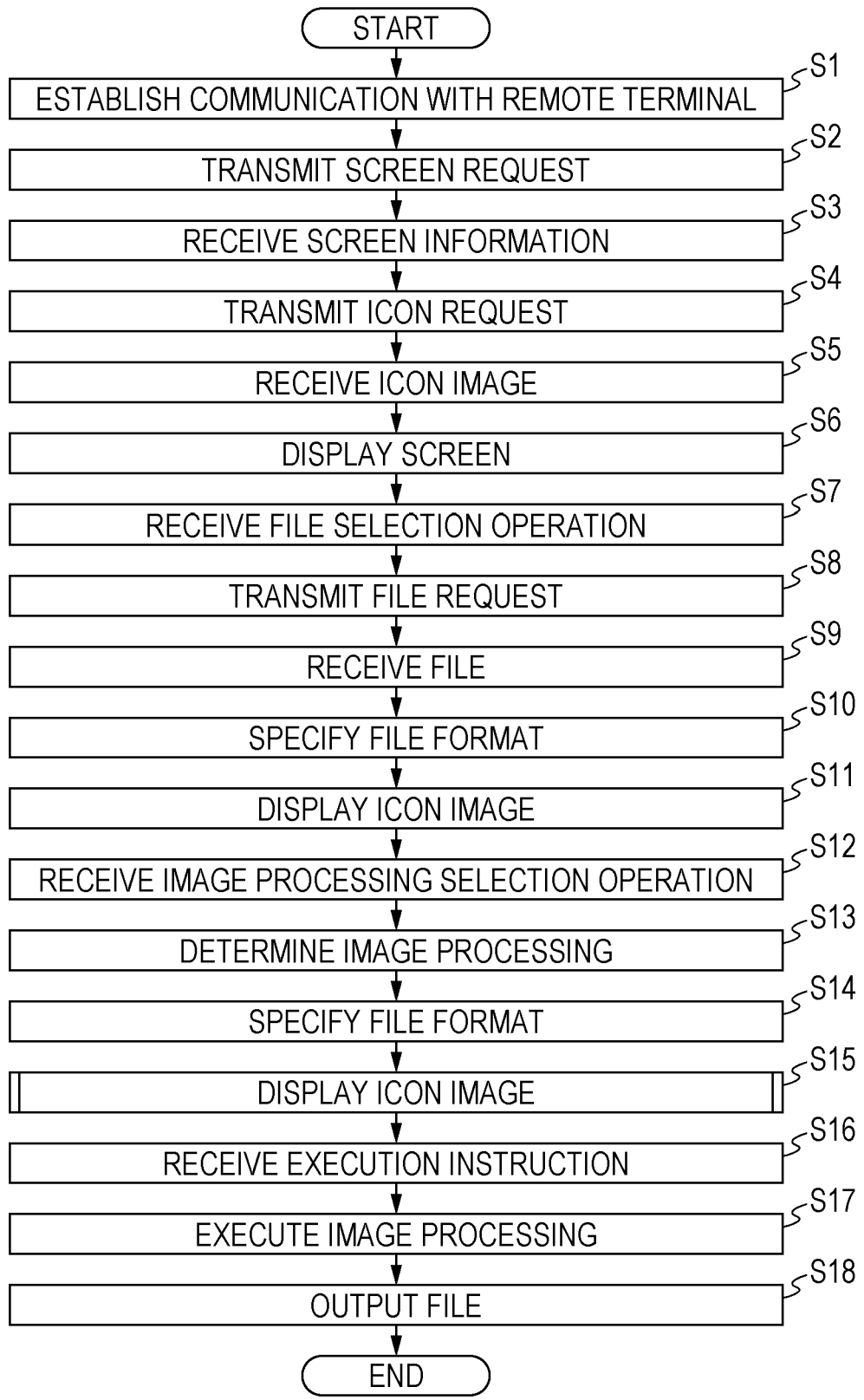
FIG. 6 is a flowchart indicating an exemplary processing procedure performed by the image processing apparatus in the first embodiment.

Next, the processing procedure performed by the image processing apparatus 1 in order to perform the cooperative operation illustrated in FIG. 4 will be described. FIG. 6 is a flowchart indicating an exemplary processing procedure performed on the image processing apparatus 1. This processing is performed by execution of the program 6 by the CPU 10a of the controller 10. After starting the processing, the image processing apparatus 1 first establishes a communication state with the remote terminal 2 (step S1). When the communication state with the remote terminal 2 is established, the image processing apparatus 1 transmits a screen request to the remote terminal 2 (step S2), and receives screen information from the remote terminal 2 (step S3). Subsequently, the image processing apparatus 1 transmits to the remote terminal 2 an icon request for requesting all icon images held by the remote terminal 2 (step S4). At this time, the image processing apparatus 1 also requests transmission of attribute information associating each of the icon images with the file format. When the icon images from the remote terminal 2 (step S5) have been received, the image processing apparatus 1 stores the icon image in the memory 10b. The image processing apparatus 1 also stores the attribute information received from the remote terminal 2 in the memory 10b. Note that the storage destination of the icon images and attribute information is not necessarily limited to the memory 10b, and may be the storage 11, for example.

Next, the image processing apparatus 1 displays a setting screen for receiving the user's setting operation on the operation panel 12 (step S6). That is, the setting screen as illustrated in FIG. 5 is displayed on the operation panel 12. At this point, however, the icon images 32 and 33 in the display region R3 are not displayed.

After displaying the setting screen, the image processing apparatus 1 receives file selection operation by the user (step S7). When a file stored in the remote terminal 2 is designated by the user, the image processing apparatus 1 transmits a file request to the remote terminal 2 (step S8), and receives a file as an image processing target from the remote terminal 2 (step S9). Together with this, the image processing apparatus 1 specifies the format of the file as the image processing target (step S10), and extracts an icon image corresponding to the file format among the plurality of icon images obtained beforehand from the remote terminal 2. Then, using the extracted icon image, the image processing apparatus 1 displays the icon image 32 indicating the file before undergoing image processing in the display region R3 on the setting screen (step S11).

Subsequently, the image processing apparatus 1 receives image processing selection operation by the user (step S12). When image processing is selected by the user, the image processing apparatus 1 determines the image processing on the basis of the user's operation (step S13), and specifies the format of the file to be generated by the determined image processing (step S14). Then, the image processing apparatus 1 executes icon image display processing for displaying the icon image corresponding to the file format after undergoing image processing (step S15).

In some cases, the icon image corresponding to the format of the file to be generated by the image processing might not be included in the plurality of icon images obtained by the image processing apparatus 1 from the remote terminal 2. For example, in a case where a file of the same file format as the file to be generated by the image processing is not stored in the remote terminal 2, the icon image corresponding to the file format might not be held in the remote terminal 2. In that case, even when all the icon images held by the remote terminal 2 have been obtained by the image processing apparatus 1, the icon image corresponding to the file format after undergoing image processing is not included in the obtained images. Therefore, the image processing apparatus 1 determines in step S15 whether an icon image corresponding to the file format after undergoing image processing has been obtained from the remote terminal 2, and switches the icon image 33 to be displayed on the operation panel 12 in accordance with the determination result.

Figures 7, 8:
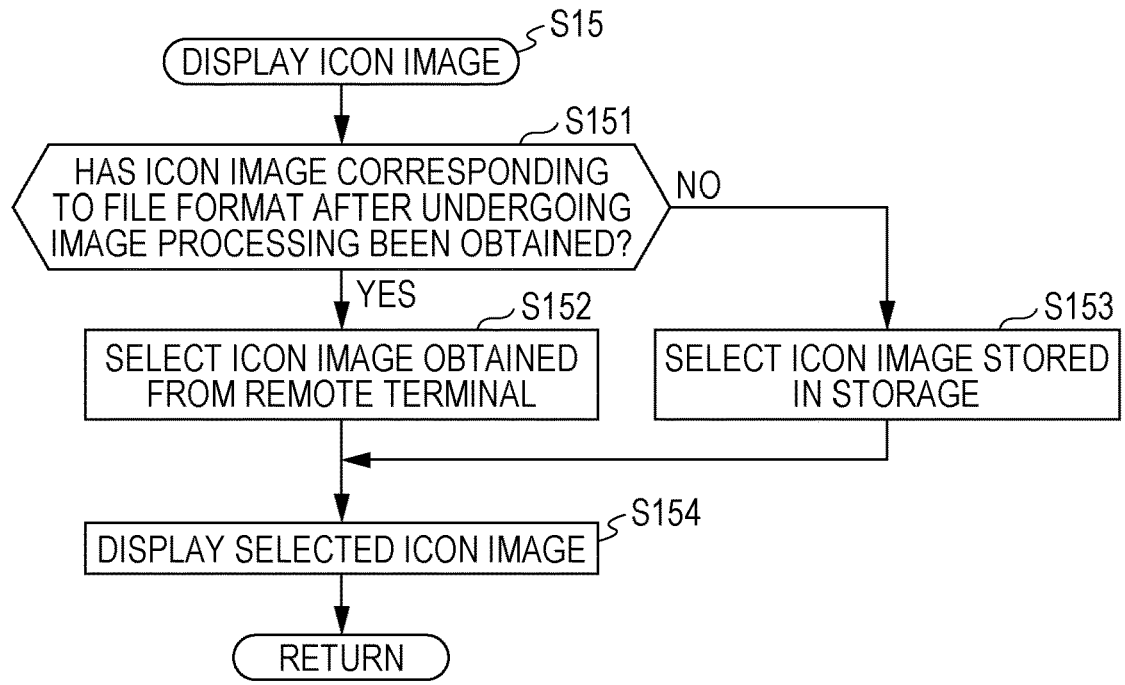
FIG. 7 is a flowchart indicating an exemplary detailed processing procedure of an icon image display processing.
FIG. 8 is a diagram illustrating exemplary file format discrimination information.

FIG. 7 is a flowchart indicating an exemplary detailed processing procedure of the icon image display processing (step S15). After starting this processing, the image processing apparatus 1 determines whether an icon image corresponding to the file format after undergoing image processing has been obtained from the remote terminal 2 (step S151). As a result, in a case where the icon image corresponding to the file format after undergoing image processing has been obtained from the remote terminal 2 (YES in step S151), the image processing apparatus 1 selects an icon image corresponding to the file format after undergoing image processing from among the plurality of icon images obtained from the remote terminal 2, as an icon image to be displayed (step S152). In contrast, in a case where the icon image corresponding to the file format after the image processing has not been obtained from the remote terminal 2 (NO in step S151), the image processing apparatus 1 selects an icon image corresponding to the file format after undergoing image processing from among the plurality of icon images 8 stored in the storage 11, as an icon image to be displayed (step S153). Then, using the icon image selected in step S152 or S153, the image processing apparatus 1 displays the icon image 33 indicating the file after undergoing image processing in the display region R3 on the setting screen (step S154). In this manner, when the image processing apparatus 1 cannot have obtained the icon image corresponding to the file format after undergoing the image processing from the remote terminal 2, the image processing apparatus 1 uses the icon image held by the image processing apparatus 1 itself to display the icon image 32 indicating a file after undergoing image processing. With this processing, it is possible to prevent an occurrence of a problem that the icon image 32 indicating the file after undergoing the image processing is not displayed in the display region R3 after designation of the image processing by the user.

Returning to the flowchart of FIG. 6, the image processing apparatus 1 receives an instruction to execute image processing by the user (step S16). When execution of image processing is instructed by the user, the image processing apparatus 1 starts execution of image processing designated by the user, and generates a file after undergoing image processing from the file before undergoing image processing (step S17). After completion of the image processing, the image processing apparatus 1 outputs the file generated by the image processing to the output destination designated by the user, and finishes all the processing procedures (step S18).

As described above, the image processing apparatus 1 of the present embodiment can perform image processing involving file format conversion, and allows a file generated by such image processing to be displayed with the icon image on the operation panel 12. Then, the icon acquisition part 22 obtains from the remote terminal 2 at least an icon image corresponding to the format of the file generated by the image processing, and the display controller 23 allows the file generated by image processing to be displayed by using the icon image obtained by the icon acquisition part 22. With this image processing apparatus 1, it is possible to unify the look-and-feel of the icon image indicating the file after undergoing the image processing involving at least file conversion with the icon image displayed on the remote terminal 2, enabling display of icons without giving strange feeling to the user.

Note that while the above embodiment is a case where the image processing apparatus 1 mainly obtains a file as an image processing target from the remote terminal 2, it is possible to apply processing similar to the above description even in a case where the file is obtained from other remote terminals 3 and 4 and image processing is performed.

Second Embodiment

Next, a second embodiment of the present invention will be described. The first embodiment described above is a case where all the icon images are obtained from the remote terminal 2 beforehand at a point of establishment of a communication state by the image processing apparatus 1 with the remote terminal 2. In a case however, where the above operation is applied when a large number of icon images is stored in the remote terminal 2, the occupation ratio of the memory 10b by the icon image obtained from the remote terminal 2 might be extremely increased to lower operation efficiency of the controller 10. Therefore, the present embodiment will be described as an embodiment enabling display of icon images corresponding to at least the file after undergoing image processing without extremely increasing the occupation ratio of the memory 10b. The configuration of the image processing apparatus 1 in the present embodiment is similar to that described in the first embodiment.

The image processing apparatus 1 of the present embodiment specifies a format of each of an input file and an output file of each of image processing with reference to the file format discrimination information 7 stored in the storage 11, and obtains from the remote terminal 2 at least an icon image necessary for indicating the file format after undergoing image processing.

FIG. 8 is a diagram illustrating an example of the file format discrimination information 7. The file format discrimination information 7 is information registering a plurality of types of image processing executable by the image processing apparatus 1, that is information defining, for each of image processing, the format of the file (input file) before undergoing processing and the format of the file (output file) after undergoing image processing. For example, definition in the case of image processing A is such that the format of the file before undergoing image processing is "TIFF" and the format of the file generated by the image processing is "JPEG", "PNG" or "PDF". Whether the format of the file generated by the image processing is set to any of "JPEG", "PNG", or "PDF" can be freely selected by execution of detailed setting of image processing by the user.

With reference to the file format discrimination information 7 as illustrated in FIG. 8, the image processing apparatus 1 can grasp that there are seven types of file formats, namely, "JPEG", "PNG", "PDF", "DOC", "XML", "BMP", and "TIFF" as formats of files that can be generated by a plurality of types of image processing A to F. Accordingly, with acquisition of the icon images corresponding to the at least seven types of file formats from the remote terminal 2, the image processing apparatus 1 can display the icon image 33 corresponding to the format of the file after undergoing image processing by the icon image obtained from the remote terminal 2 even when any of the plurality of types of image processing A to F is executed.

Figure 9:
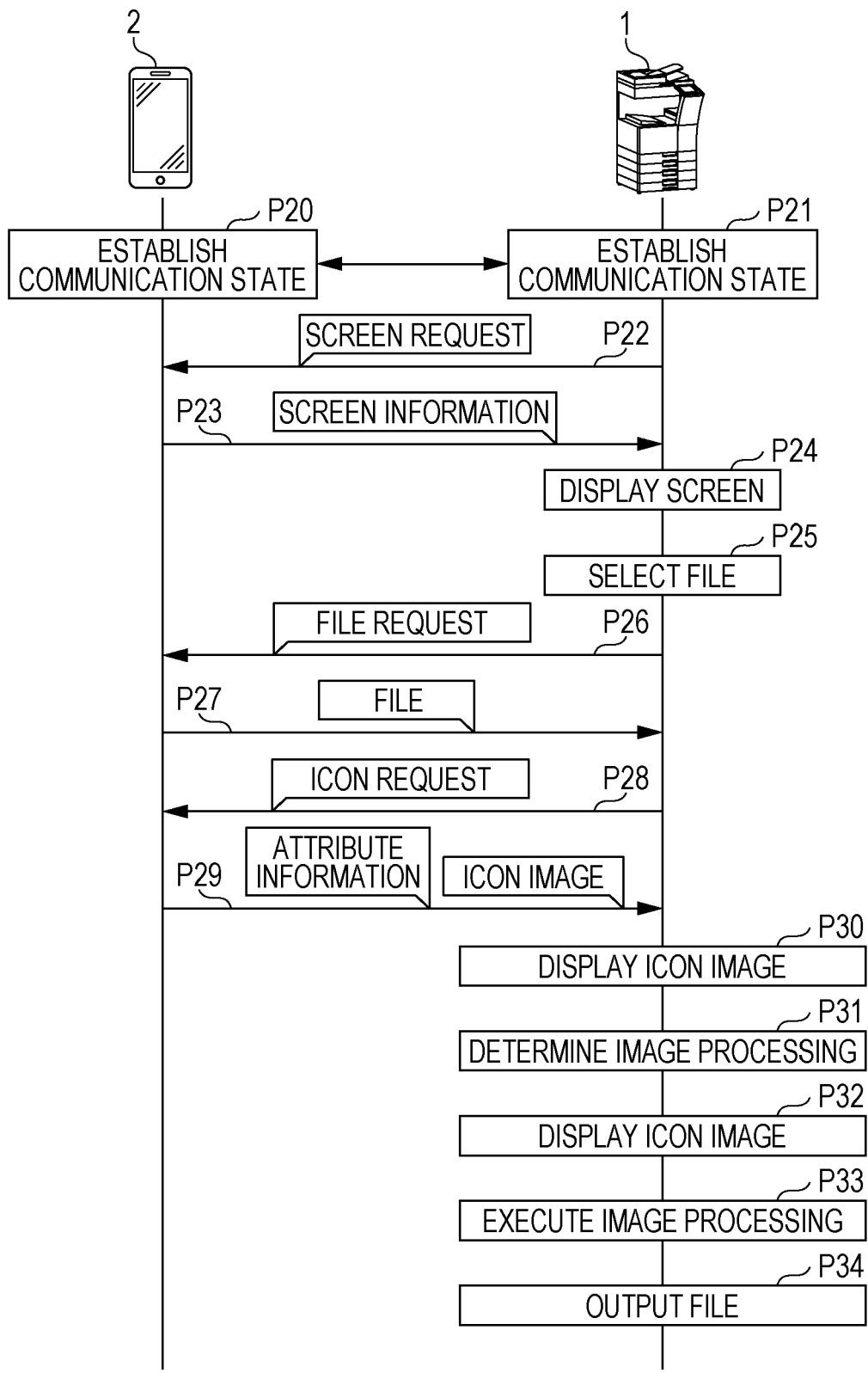
FIG. 9 is a diagram illustrating exemplary operation in which an image processing apparatus and a remote terminal cooperate with each other in a second embodiment.

FIG. 9 is a diagram illustrating exemplary operation in which the image processing apparatus 1 and the remote terminal 2 cooperate with each other in the second embodiment. First, the remote terminal 2 and the image processing apparatus 1 establish a communication state with each other (processes P20 and P21). Then, the image processing apparatus 1 transmits a screen request to the remote terminal 2 (process P22), and obtains screen information from the remote terminal 2 (process P23). Then, the image processing apparatus 1 activates the display controller 23 to display a setting screen for receiving the image processing setting operation by the user (process P24). After displaying the setting screen, the image processing apparatus 1 receives file selection operation by the user (process P25). After execution of the file selection operation by the user, the file selector 24 instructs the file acquisition part 25 of a file to be obtained from the remote terminal 2. Then, the file acquisition part 25 transmits a file request designating one file to the remote terminal 2 (process P26), and obtains a file as an image processing target from the remote terminal 2 (process P27). The file acquisition part 25 obtains the file from the remote terminal 2, specifies the format of the file, and notifies the icon acquisition part 22 of the file format. This allows the icon acquisition part 22 to grasp the format of the file as an image processing target.

With reference to the file format discrimination information 7 illustrated in FIG. 8, the icon acquisition part 22 can specify all the image processing that can set the image processing target file as an input file. For example, in a case where the format of a file as an image processing target is "PDF", it is possible to specify two types of image processing B and C with reference to the file format discrimination information 7 of FIG. 8. Furthermore, on the basis of the file format discrimination information 7, the icon acquisition part 22 specifies all the formats of the files generated by the specified image processing. For example, in a case where the two types of image processing B and C are specified as described above, the icon acquisition part 22 refers to the file format discrimination information 7 to specify three file formats "DOC", "XML" and "JPEG" as formats of the files generated by these two types of image processing B and C.

Then, the icon acquisition part 22 transmits to the remote terminal 2 an icon request of requesting an icon image corresponding to "PDF" as a format of a file as an image processing target, and an icon image corresponding to each of "DOC", "XML", and "JPEG" as a format of a file that can be generated by image processing (process P28), and then, receives from the remote terminal 2 an icon image corresponding to each of "PDF", "DOC", "XML" and "JPEG" together with attribute information indicating which file format each of the icon images is to display (process P29).

The image processing apparatus 1 activates the display controller 23 to specify an icon image corresponding to the format of the file as an image processing target from among the plurality of icon images obtained from the remote terminal 2 on the basis of the attribute information obtained from the remote terminal 2. Then, the display controller 23 displays the specified icon image as the icon image 32 corresponding to the format of the file before undergoing image processing, in the display region R3 (process P30). With this processing, when the file as the image processing target is designated by the user, the icon image 32 indicating the format of the file before undergoing processing, as the image processing target, is to be displayed in the display region R3, by an image same as the icon image displayed on the remote terminal 2.

Next, the image processing apparatus 1 receives image processing selection operation by the user. In a case where the image processing selected by the user is capable of generating a plurality of types of files having different file formats, the image processing apparatus 1 also receives selection operation of the file format generated by the image processing. The image processing apparatus 1 receives the image processing selection operation by the user, activates the image processing determination part 26 to determine the image processing on the basis of the selection operation by the user (process P31). Then, image processing is instructed from the image processing determination part 26 to the image processor 27. The image processing determination part 26 determines image processing, specifies a format of the file to be generated by the image processing, and notifies the display controller 23 of the specified file format. Thus, the display controller 23 can grasp the format of the file to be generated by the image processing. Accordingly, with determination of the format of the file generated by the image processing, the display controller 23 specifies an icon image corresponding to the file format among a plurality of icon images obtained from the remote terminal 2, on the basis of the attribute information obtained from the remote terminal 2. Then, the display controller 23 displays the specified icon image as the icon image 33 corresponding to the format of the file after undergoing image processing in the display region R3 (process P32). With this processing, when the image processing is selected by the user, the icon image 33 indicating the format of the file after undergoing image processing is to be displayed in the display region R3, with an image same as the icon image displayed on the remote terminal 2.

Subsequently, the image processing apparatus 1 activates the image processor 27 to execute image processing on the file to be an image processing target to generate a new file (process P33). Thereafter, the image processing apparatus 1 allows the file output part 28 to output the file generated by the image processing to an output destination designated by the user (process P34).

As described above, the image processing apparatus 1 performs cooperative operation with the remote terminal 2 to enable displaying an icon image same as the icon image displayed on the remote terminal 2 when displaying the icon images 32 and 33 corresponding to the file formats before and after undergoing image processing, and thus, can achieve effects similar to the case of the first embodiment.

Figure 10:
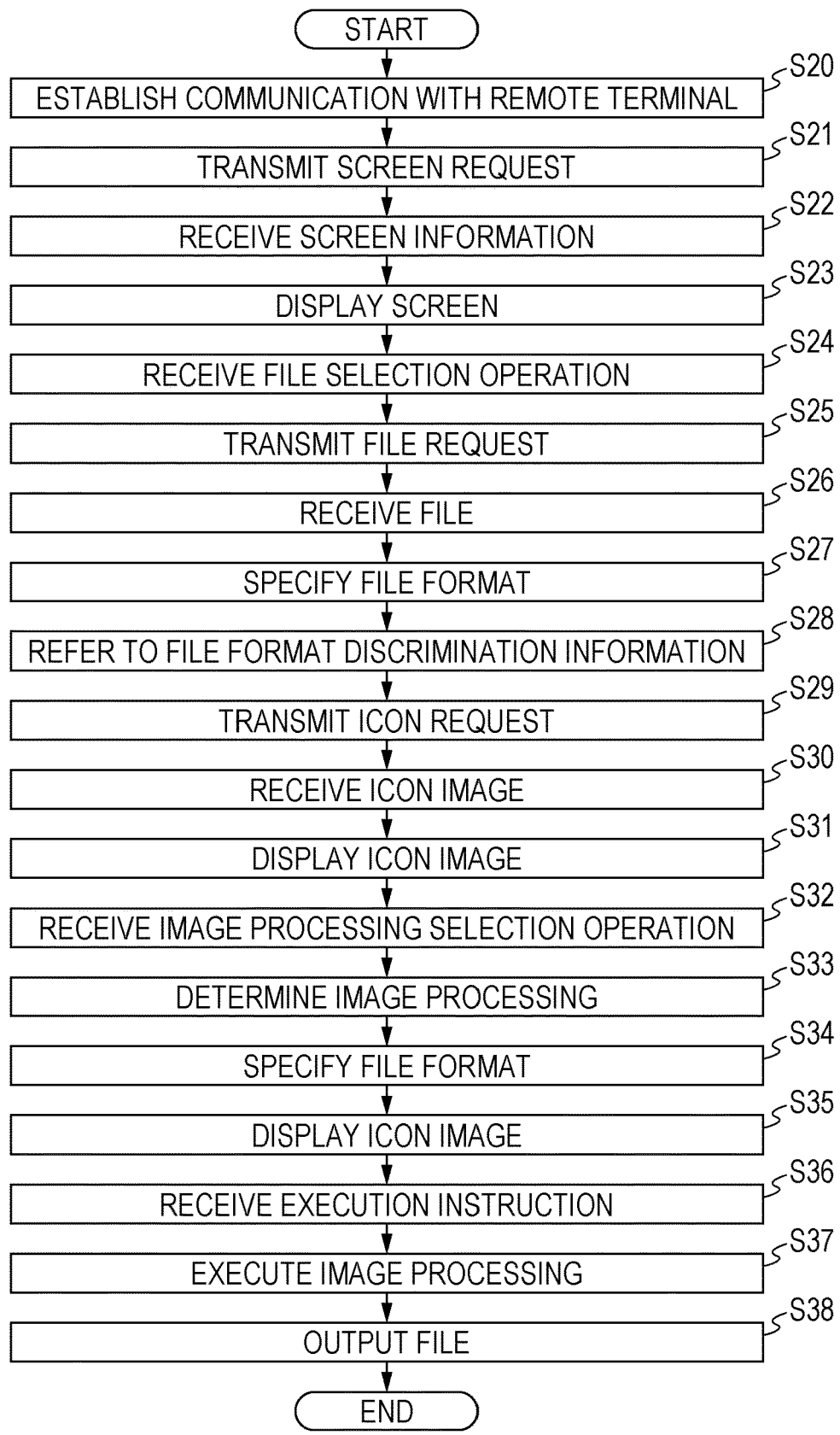
FIG. 10 is a flowchart indicating an exemplary processing procedure performed by the image processing apparatus in the second embodiment.

Next, the processing procedure performed by the image processing apparatus 1 in order to perform the cooperative operation illustrated in FIG. 9 will be described. FIG. 10 is a flowchart indicating an exemplary processing procedure performed by the image processing apparatus 1. This processing is performed by execution of the program 6 by the CPU 10a of the controller 10. When the communication state with the remote terminal 2 is established (step S20), the image processing apparatus 1 transmits a screen request to the remote terminal 2 (step S21), and receives screen information from the remote terminal 2 (step S22). Next, the image processing apparatus 1 displays a setting screen for receiving the setting operation by the user on the operation panel 12 (step S23).

After displaying the setting screen, the image processing apparatus 1 receives file selection operation by the user (step S24), and transmits a file request to the remote terminal 2 (step S25). Then, the image processing apparatus 1 receives a file as an image processing target from the remote terminal 2 (step S26). Together with this, the image processing apparatus 1 specifies the format of the file as an image processing target (step S27), and refers to the file format discrimination information 7 (step S28). This enables the image processing apparatus 1 to specify executable image processing toward a file obtained from the remote terminal 2, and enables specifying all the file formats of files that can be generated by the image processing.

Subsequently, the image processing apparatus 1 activates the icon acquisition part 22. The icon acquisition part 22 transmits an icon request for requesting an icon image corresponding to the file format specified in steps S27 and S28 among the plurality of icon images held by the remote terminal 2 (step S29). At this time, the image processing apparatus 1 also requests transmission of attribute information associating each of the icon images with the file format. When the icon images from the remote terminal 2 (step S30) have been received, the image processing apparatus 1 stores the icon image in the memory 10b. The image processing apparatus 1 also stores the attribute information received from the remote terminal 2 in the memory 10b.

The display controller 23 extracts an icon image corresponding to the format of the file as an image processing target from among the plurality of icon images obtained from the remote terminal 2. Then, using the extracted icon image, the display controller 23 displays the icon image 32 indicating the file before undergoing image processing in the display region R3 on the setting screen (step S31).

Subsequently, the image processing apparatus 1 receives image processing selection operation by the user (step S32). After image processing is selected by the user, the image processing apparatus 1 determines the image processing on the basis of the user's operation (step S33) and specifies the format of the file generated by the determined image processing (step S34). Then, the display controller 23 extracts the icon image corresponding to the file format after undergoing image processing from the icon images obtained from the remote terminal 2, and uses the extracted icon image to display the icon image 33 indicating the file after undergoing the image processing in the display region R3 on the setting screen (step S35). Note that in a case where the icon image corresponding to the file format after undergoing the image processing cannot be obtained from the remote terminal 2, icon image display is performed using the icon image 8 stored in the storage 11, which is similar to the case of the first embodiment.

Thereafter, the image processing apparatus 1 receives an image processing execution instruction by the user (step S36), starts execution of image processing, and generates a file after undergoing image processing from the file before undergoing image processing (step S37). After completion of the image processing, the image processing apparatus 1 outputs the file generated by the image processing to the output destination designated by the user, and finishes all the processing procedures (step S38).

As described above, the image processing apparatus 1 according to the present embodiment does not obtain all the icon images from the remote terminal 2, but obtains solely the icon image corresponding to the format of the file that can be at least generated by the image processing. This makes it possible to suppress an excessive increase in the occupation ratio of the memory 10*b* by the icon image, so as to prevent a decrease in the operation efficiency of the controller 10.

Note that portions other than the configuration and operation described above in the image processing apparatus 1 of the present embodiment are similar to those described in the first embodiment.

Third Embodiment

Next, a third embodiment of the present invention will be described. The second embodiment described above is an exemplary case of obtaining the icon image corresponding to the format of the file that can be generated by the image processing from the remote terminal 2 before determination of image processing to be performed on a file. The present embodiment describes a mode of obtaining one icon image corresponding to the format of the file generated by the image processing from the remote terminal 2 after determination of image processing. The configuration of the image processing apparatus 1 in the present embodiment is also similar to the configuration described in the first embodiment.

Figure 11:
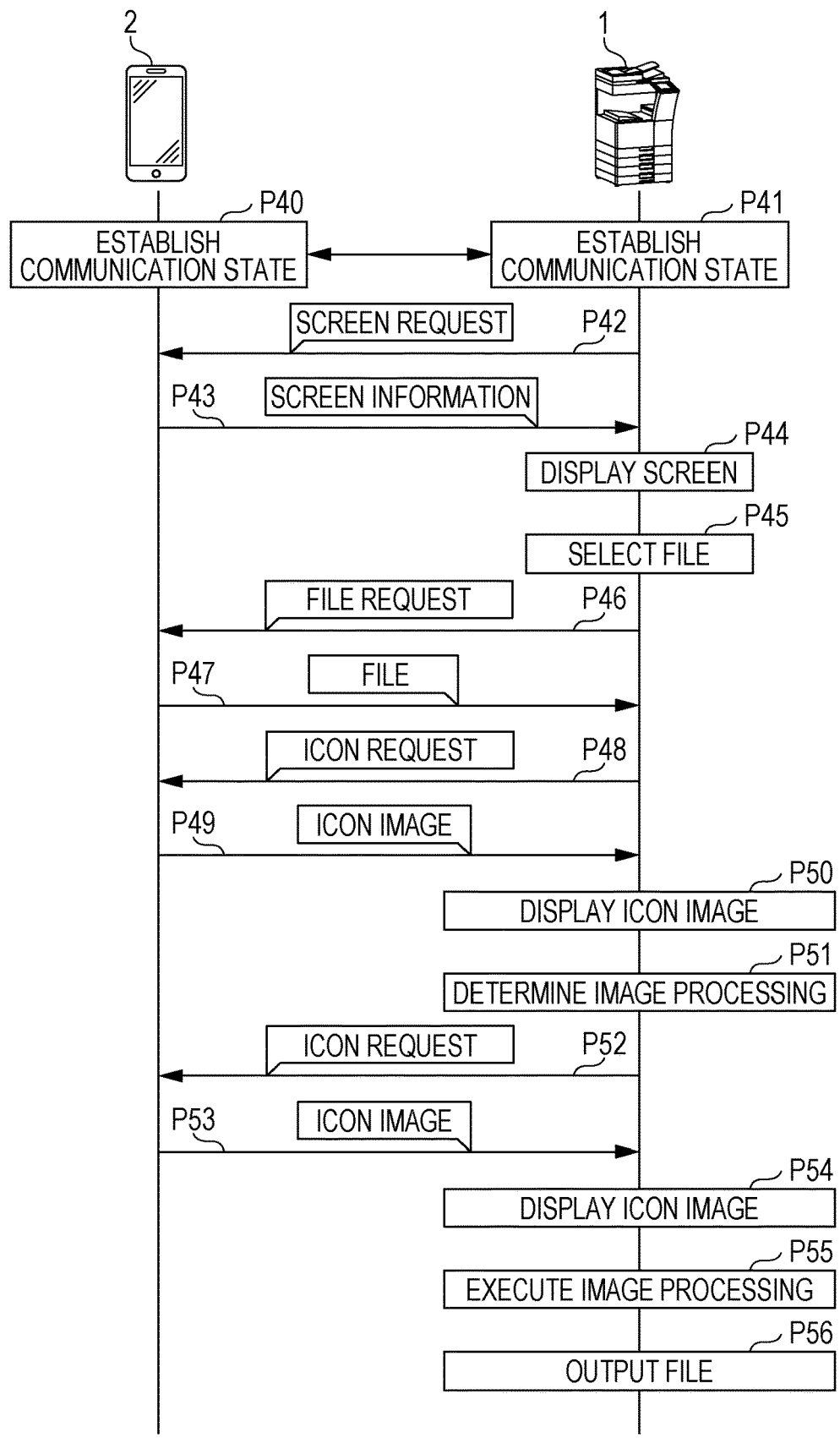
FIG. 11 is a diagram illustrating exemplary operation in which an image processing apparatus and a remote terminal cooperate with each other in a third embodiment.

FIG. 11 is a diagram illustrating exemplary operation in which the image processing apparatus 1 and the remote terminal 2 cooperate with each other in the third embodiment. Processes P40 to P45 illustrated in FIG. 11 are similar to the processes P20 to P25 illustrated in FIG. 9, and thus, the description thereof will be omitted. The file acquisition part 25 transmits a file request designating the user selected file to the remote terminal 2 (process P46), and obtains a file to be an image processing target from the remote terminal 2 (process P47). The file acquisition part 25 obtains the file from the remote terminal 2, specifies the format of the file, and notifies the icon acquisition part 22 of the file format.

When the format of the file as the image processing target is identified, the icon acquisition part 22 transmits an icon request for requesting the icon image corresponding to the file format to the remote terminal 2 (process P48). This enables the icon acquisition part 22 to obtain one icon image corresponding to the format of the file as an image processing target from the remote terminal 2 (process P49). At this time, since there is a single icon image to be obtained, the icon acquisition part 22 does not need to obtain attribute information indicating whether the file format is to be displayed from the remote terminal 2.

Then, the image processing apparatus 1 activates the display controller 23 to display the icon image obtained from the remote terminal 2 as the icon image 32 corresponding to the format of the file before undergoing image processing in the display region R3 (process P50). With this processing, when the file as the image processing target is designated by the user, the icon image 32 indicating the format of the file before undergoing processing, as the image processing target, is to be displayed in the display region R3, by an image of the icon image displayed on the remote terminal 2.

Next, the image processing apparatus 1 receives image processing selection operation by the user. The image processing apparatus 1 receives the image processing selection operation by the user, activates the image processing determination part 26 to determine the image processing on the basis of the selection operation by the user (process P51). Then, image processing is instructed from the image processing determination part 26 to the image processor 27. The image processing determination part 26 determines image processing, specifies a format of the file to be generated by the image processing, and notifies the icon acquisition part 22 of the specified file format.

When the format of the file to be generated in image processing is identified, the icon acquisition part 22 transmits an icon request for requesting the icon image corresponding to the file format to the remote terminal 2 (process P52). This enables the icon acquisition part 22 to obtain one icon image corresponding to the format of the file to be generated in the image processing from the remote terminal 2 (process P53). At this time, since there is also a single icon image to be obtained, the icon acquisition part 22 does not need to obtain attribute information indicating whether the file format is to be displayed from the remote terminal 2.

Then, the image processing apparatus 1 again activates the display controller 23 to display the icon image obtained from the remote terminal 2 as the icon image 33 corresponding to the format of the file after undergoing image processing, in the display region R3 (process P54). With this processing, when the image processing is designated by the user, the icon image 33 indicating the format of the file after undergoing image processing is displayed in the display region R3, with an image same as the icon image displayed on the remote terminal 2.

Subsequently, the image processing apparatus 1 activates the image processor 27 to execute image processing on the file as an image processing target on the basis of the instruction of image processing by the user so as to generate a new file (process P55). Thereafter, the image processing apparatus 1 activates the file output part 28 to output the file generated by the image processing to an output destination designated by the user (process P56).

Accordingly, the image processing apparatus 1 according to the present embodiment performs the above-described cooperative operation with the remote terminal 2 to enable displaying an icon image same as the icon image displayed on the remote terminal 2 when displaying the icon images 32 and 33 corresponding to the file formats before and after undergoing image processing, and thus, can achieve effects similar to the case of the first embodiment.

Figure 12:
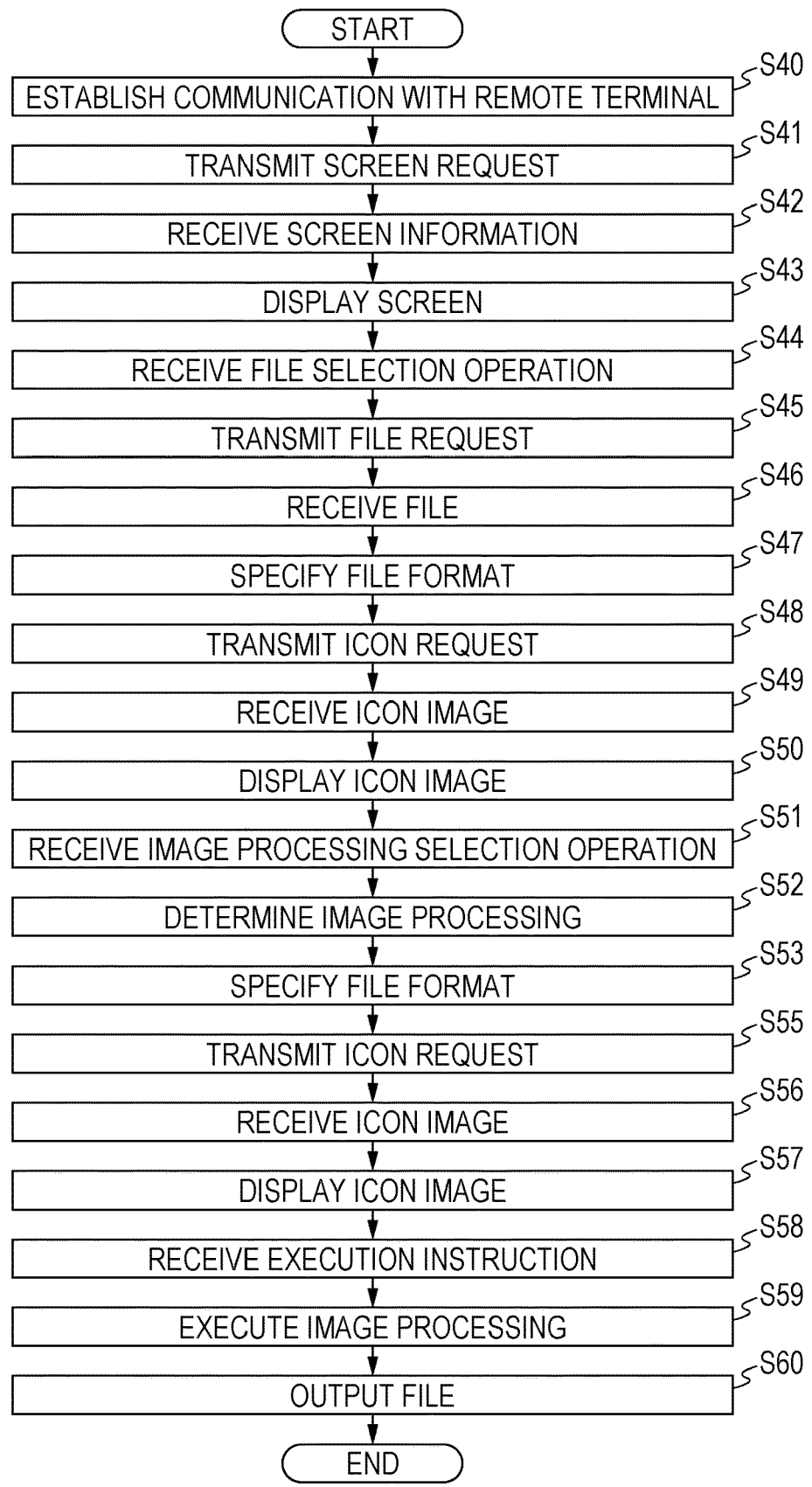
FIG. 12 is a flowchart indicating an exemplary processing procedure performed by the image processing apparatus in the third embodiment.

Next, the processing procedure performed by the image processing apparatus 1 in order to perform the cooperative operation illustrated in FIG. 11 will be described. FIG. 12 is a flowchart indicating an exemplary processing procedure performed by the image processing apparatus 1. This processing is performed by execution of the program 6 by the CPU 10a of the controller 10. In FIG. 12, since the processing of steps S40 to S46 is similar to the processing of steps S20 to S26 illustrated in FIG. 10, the description will be omitted.

After receiving the file as the image processing target from the remote terminal 2, the image processing apparatus 1 specifies the format of the received file (step S47). Then, the image processing apparatus 1 activates the icon acquisition part 22. The icon acquisition part 22 transmits, to the remote terminal 2, an icon request for requesting an icon image corresponding to the file format specified in step S47 among the plurality of icon images held by the remote terminal 2 (step S48). After receiving the icon image from the remote terminal 2 (step S49), the image processing apparatus 1 activates the display controller 23. Then, using the icon image obtained from the remote terminal 2, the display controller 23 displays the icon image 32 indicating the file before undergoing image processing in the display region R3 on the setting screen (step S50).

Subsequently, the image processing apparatus 1 receives selection operation of the image processing by the user (step S51). When the image processing is selected by the user, the image processing apparatus 1 determines the image processing on the basis of the user's operation (step S52) and specifies the format of the file generated by the determined image processing (step S53). Then, the image processing apparatus 1 activates the icon acquisition part 22 again to transmit, to the remote terminal 2, an icon request for requesting an icon image corresponding to the file format specified in step S53 among the plurality of icon images held by the remote terminal 2 (step S55). After receiving the icon image from the remote terminal 2 (step S56), the image processing apparatus 1 activates the display controller 23. Then, using the icon image obtained from the remote terminal 2, the display controller 23 displays the icon image 33 indicating the file after undergoing image processing in the display region R3 on the setting screen (step S57). Note that in a case where the icon image corresponding to the file format after undergoing the image processing cannot be obtained from the remote terminal 2, icon image display is performed using the icon image 8 stored in the storage 11, which is similar to the case of the first embodiment.

Thereafter, the image processing apparatus 1 receives an instruction to execute image processing by the user (step S58), starts execution of image processing, and generates a file after undergoing image processing from the file before undergoing image processing (step S59). After completion of the image processing, the image processing apparatus 1 outputs the file generated by the image processing to the output destination designated by the user, and finishes all the processing procedures (step S60).

As described above, the image processing apparatus 1 according to the present embodiment obtains icon images corresponding to file formats of files before and after undergoing image processing one by one from the remote terminal 2, making it possible to minimize the occupancy of the memory 10b by the icon image obtained from the remote terminal 2.

The present embodiment, however, generates communication between the image processing apparatus 1 and the remote terminal 2 after designation of the image processing by the user, leading to a possibility of prolonged time needed to display the icon image 33 corresponding to the format of the file after undergoing the image processing in the image processing apparatus 1 after designation of the image processing, than in the first and second embodiments described above. Therefore, it is preferable that the above-described operation is performed, for example, in a case where the communication speed between the image processing apparatus 1 and the remote terminal 2 is higher than a predetermined value.

Note that portions other than the configuration and operation described above in the image processing apparatus 1 of the present embodiment are similar to those described in the first embodiment.

Fourth Embodiment

Figure 13:
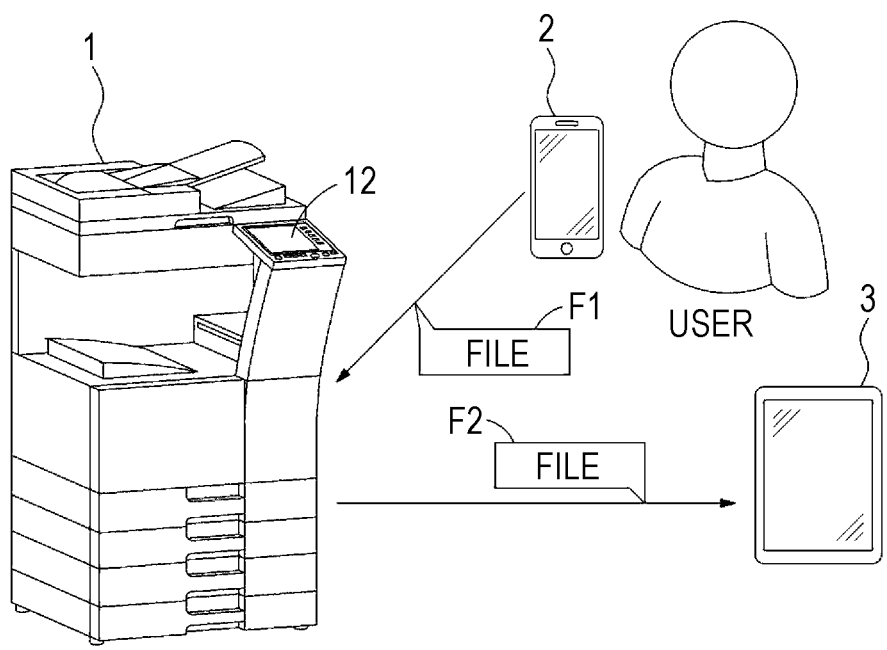
FIG. 13 is a diagram illustrating an example of file input/output by the image processing apparatus of a fourth embodiment.

Next, a fourth embodiment of the present invention will be described. FIG. 13 is a diagram illustrating an example of file input/output by the image processing apparatus 1 according to the present embodiment. As illustrated in FIG. 13, the image processing apparatus 1 of the present embodiment establishes a communication state with each of a first remote terminal 2 and a second remote terminal 3 possessed by a same user, and obtains a file before undergoing processing F1 as an image processing target from the first remote terminal 2, and output a new file F2 generated in image processing, to the second remote terminal 3. For example, in a case where an operating system of the first remote terminal 2 is different from an operating system of the second remote terminal 3, the icon images stored in the first remote terminal 2 and the second remote terminal 3 might be different from each other. Therefore, when the second remote terminal 3 displays an icon image corresponding to the file F2 after receiving the file F2 from the image processing apparatus 1, there might be a case where an icon image having difference look-and-feel from the image displayed on the first remote terminal 2 and the image processing apparatus 1, leading to a possibility of giving a strange feeling to the user. To cope with this, the present embodiment to be described is an embodiment in which the icon image displayed on the first remote terminal 2 can be displayed when the icon image corresponding to the file F2 is displayed on the second remote terminal 3.

Figure 14:
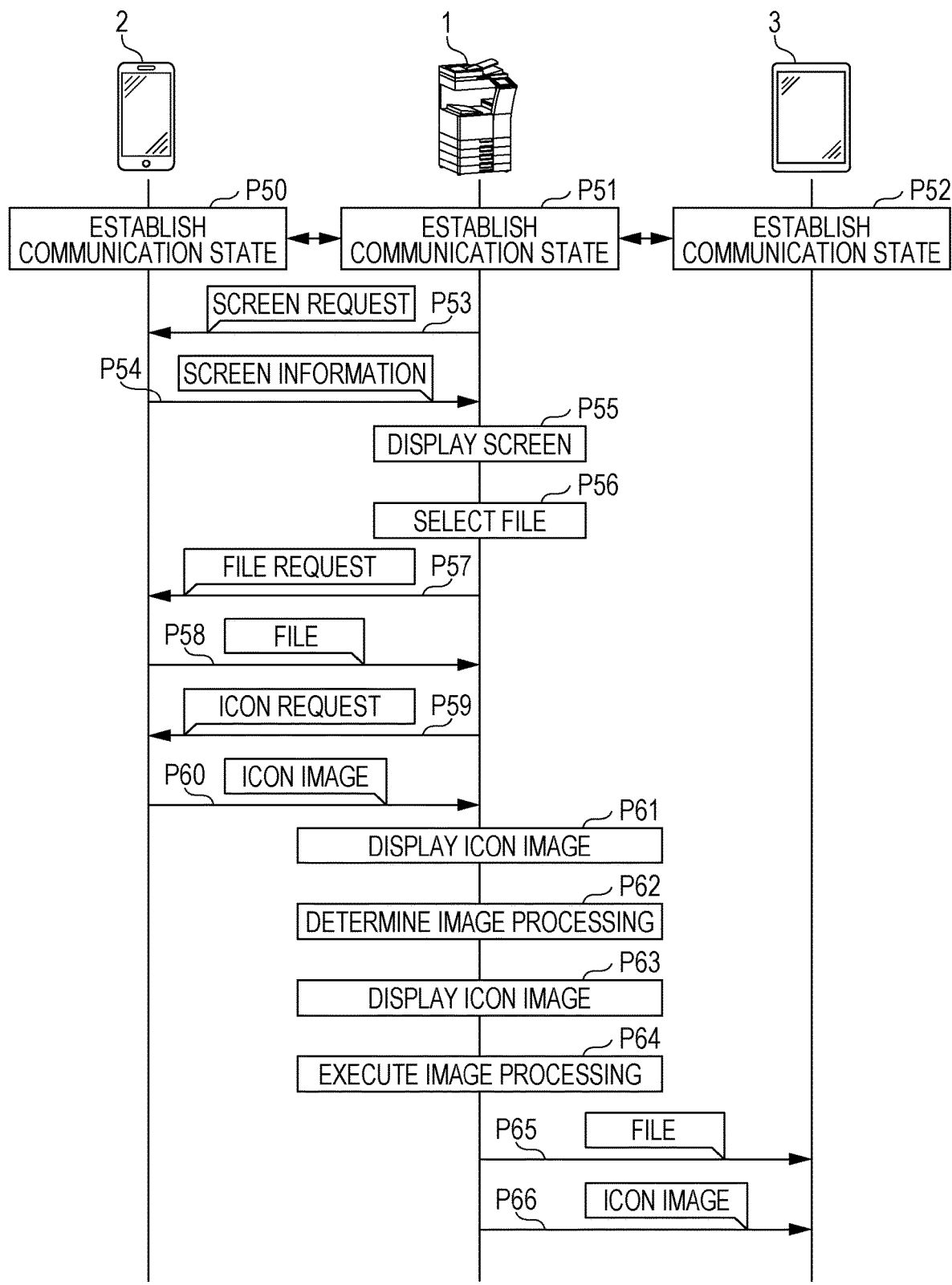
FIG. 14 is a diagram illustrating exemplary operation in which an image processing apparatus and a remote terminal cooperate with each other in the fourth embodiment.

FIG. 14 is a diagram illustrating exemplary operation in which the image processing apparatus 1 and the remote terminals 2 and 3 cooperate with each other in the fourth embodiment. First, the image processing apparatus 1 establishes a communication state with each of the first and second remote terminals 2 and 3 (processes P50, P51, and P52). After the image processing apparatus 1 establishes the communication state with the first and second remote terminals 2 and 3, the image processing apparatus 1 performs operation similar to the case of the second embodiment, for example, so as to obtain a file designated by the user from the first remote terminal 2 while obtaining an icon image corresponding to a format of a file as an image processing target and an icon image corresponding to a format of a file that can be generated by image processing. Then, with the selection of the image processing by the user, the image processing apparatus 1 uses the icon image obtained from the first remote terminal 2 to display the icon image corresponding to the format of the file generated by the image processing. That is, the processes P53 to P63 illustrated in FIG. 14 are similar to the processes P22 to P32 illustrated in FIG. 9. Note that the operation of the image processing apparatus 1 to obtain the icon image from the first remote terminal 2 is not limited to the operation described in the second embodiment, and it is allowable to apply the operation described in the first embodiment, or the operation described in the third embodiment.

Then, the image processing apparatus 1 activates the image processor 27 on the basis of the execution instruction of image processing by the user so as to execute image processing on the file as an image processing target to generate a new file (process P64). The image processing apparatus 1 executes image processing to generate a file, and outputs the generated file to the second remote terminal 3 (process P65). The image processing apparatus 1 also outputs to the second remote terminal 3 an icon image obtained from the first remote terminal 2, that is, the icon image corresponding to the format of the file generated by the image processing (process P66).

In this manner, when outputting a file generated by the image processing to the second remote terminal 3, the image processing apparatus 1 transmits an icon image obtained from the first remote terminal 2, being the icon image corresponding to the format of the file generated by the image processing, to the second remote terminal 3. Accordingly, when displaying the icon image corresponding to the format of the file received from the image processing apparatus 1, the second remote terminal 3 can display the icon image using the icon image received together with the file from the image processing apparatus 1. As a result, the icon image displayed on the second remote terminal 3 becomes the same image as the icon image displayed on the first remote terminal, making it possible to unify the look-and-feel of the icon images.

Note that portions other than the configuration and operation described above in the present embodiment are similar to those described in each of the embodiments.

Fifth Embodiment

Figure 15:
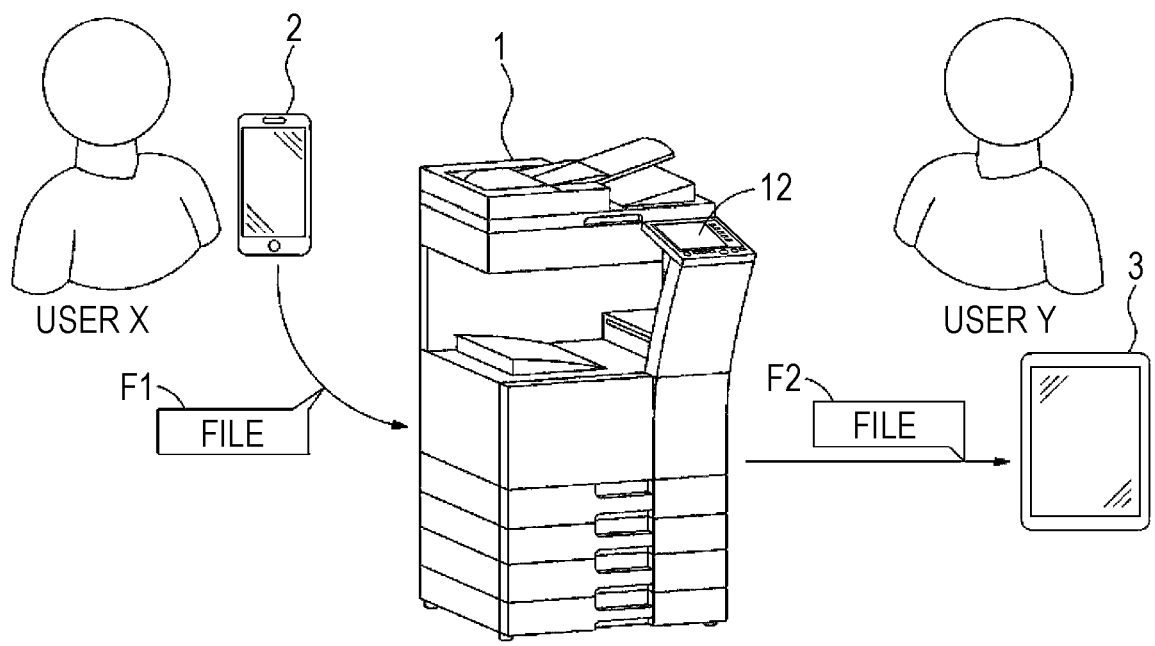
FIG. 15 is a diagram illustrating an example of file input/output by the image processing apparatus of a fifth embodiment.

Next, a fifth embodiment of the present invention will be described. FIG. 15 is a diagram illustrating an example of file input/output by the image processing apparatus 1 according to the present embodiment. As illustrated in FIG. 15, the image processing apparatus 1 of the present embodiment establishes a communication state between the first remote terminal 2 possessed by an user X and the second remote terminal 3 possessed by a user Y, obtains the file F1 as the image processing target before undergoing processing from the first remote terminal 2, and outputs the new file F2 generated in the image processing, to the second remote terminal 3.

In the above usage mode, the user X and the user Y sometimes perform settings related to image processing while simultaneously watching the operation panel 12. In such a case, it would be preferable that the icon image corresponding to the format of the file before processing, as an image processing target be displayed on the operation panel 12 using the icon image obtained from the first remote terminal 2, and that the icon image corresponding to the format of the file after undergoing image processing be displayed on the operation panel 12 using the icon image obtained from the second remote terminal 3. Accordingly, the present embodiment to be described is an exemplary case in which the image processing apparatus 1 displays the icon image corresponding to the file format before and after undergoing image processing using the icon images obtained from each of the first and second remote terminals 2 and 3.

Figure 16:
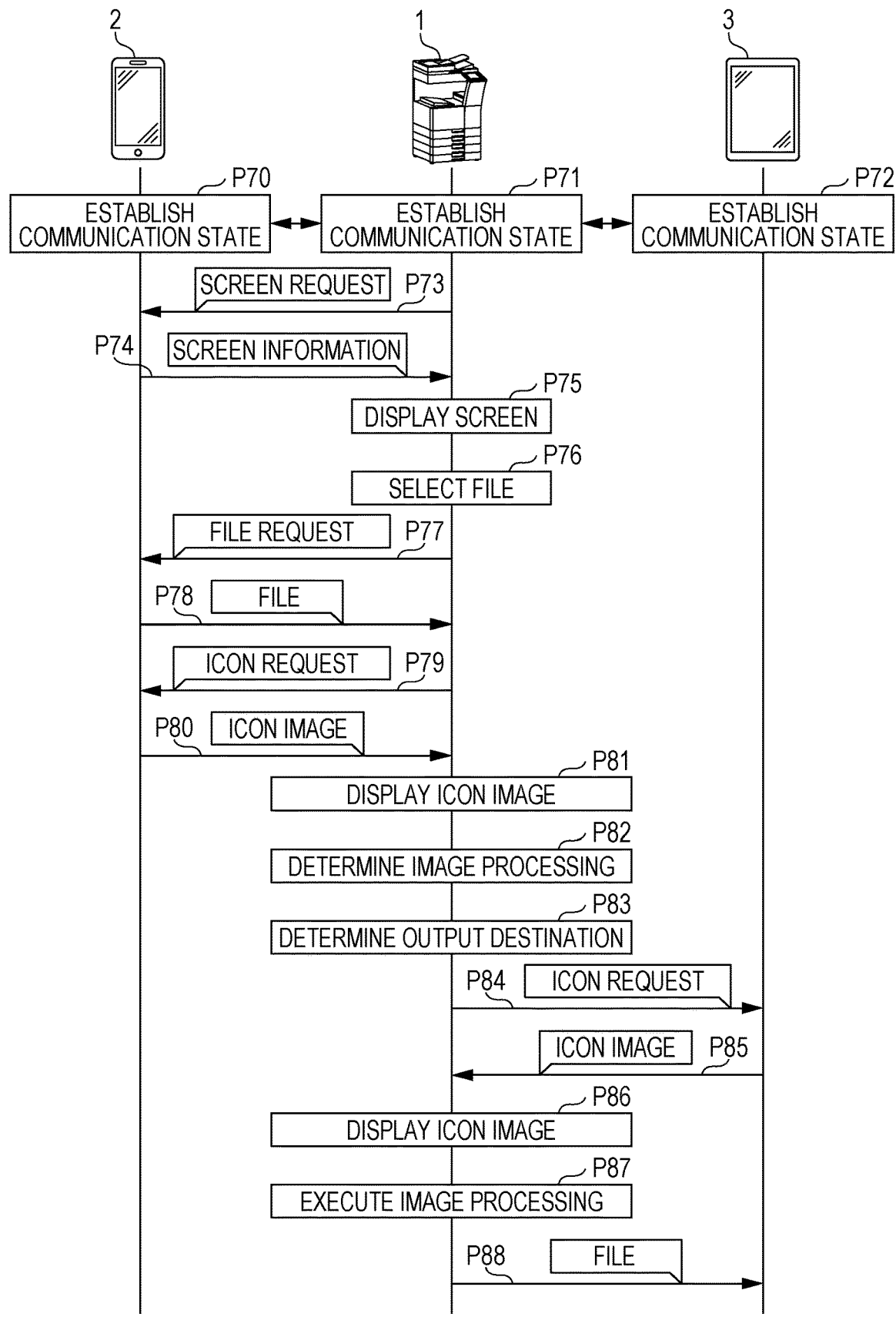
FIG. 16 is a diagram illustrating exemplary operation in which an image processing apparatus and a remote terminal cooperate with each other in the fifth embodiment.

FIG. 16 is a diagram illustrating exemplary operation in which the image processing apparatus 1 and the remote terminals 2 and 3 cooperate with each other in the fifth embodiment. Note that the processes P70 to P82 illustrated in FIG. 16 are similar to the processes P50 to P62 illustrated in FIG. 14. Note that the operation of the image processing apparatus 1 to obtain the icon image from the first remote terminal 2 is not limited to the operation illustrated in FIG. 16, and it is allowable to apply the operation described in the first embodiment, or the operation described in the third embodiment.

After the image processing apparatus 1 determines the image processing on the basis of the operation of the user X or Y (process P82), the image processing apparatus 1 further determines an output destination of the file F2 generated by the image processing on the basis of the operation of the user X or Y (process P83). Then, in a case where the second remote terminal 3 is designated as the output destination by the user X or Y, the image processing apparatus 1 transmits an icon request to the second remote terminal 3 (process P84). At this time, the icon acquisition part 22 transmits an icon request requesting an icon image corresponding to the format of the file F2 generated by the image processing (process P84). Then, the image processing apparatus 1 obtains an icon image corresponding to the format of the file F2 from the second remote terminal 3 as the output destination of the file F2 (process P85).

The image processing apparatus 1 activates the display controller 23 to use the icon image obtained from the second remote terminal 3 to perform display as the icon image 33 corresponding to the format of the file F2 after undergoing image processing, in the display region R3 (process P86). With this processing, when the second remote terminal 3 is designated as the output destination of the file F2, the icon image 33 indicating the format of the file after undergoing image processing is to be displayed in the display region R3, with an image same as the icon image displayed on the second remote terminal 3. Meanwhile, the icon image 32 indicating the format of the file before undergoing image processing is displayed by an image same as the icon image displayed on the first remote terminal 2, similarly to each of the embodiments described above. Therefore, the user X can grasp the format of the file F1 as the image processing target in the icon image familiar to the user X and the user Y can grasp the format of the file F2 after undergoing the image processing in the icon image familiar to the user X.

Note that portions other than the configuration and operation described above in the present embodiment are similar to those described in each of the embodiments.

Other Embodiments

When the icon acquisition part 22 obtains an icon image from the remote terminal 2, the icon acquisition part 22 may communicate with the operating system of the remote terminal 2, or may communicate with an application running on the remote terminal 2.

Figure 17A:
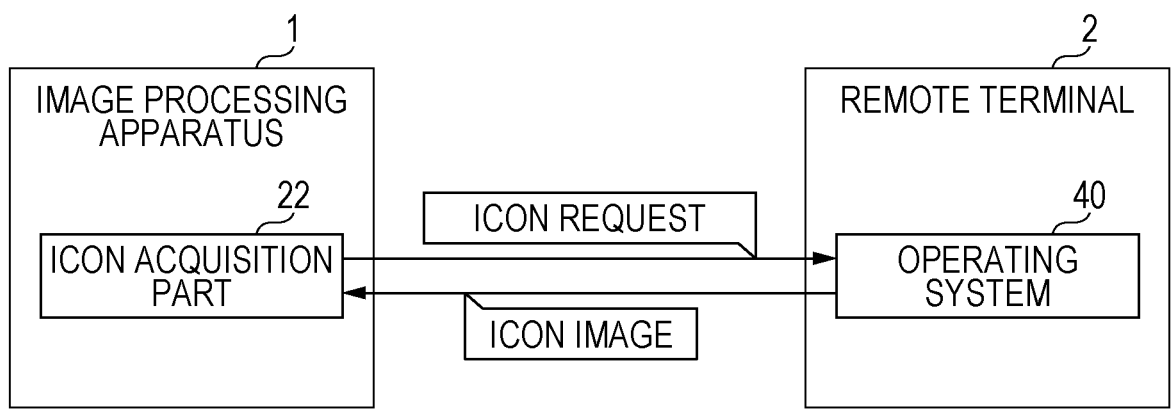
FIGS. 17A and 17B are diagrams illustrating exemplary communication of an icon acquisition part with the remote terminal.
Figure 17B:
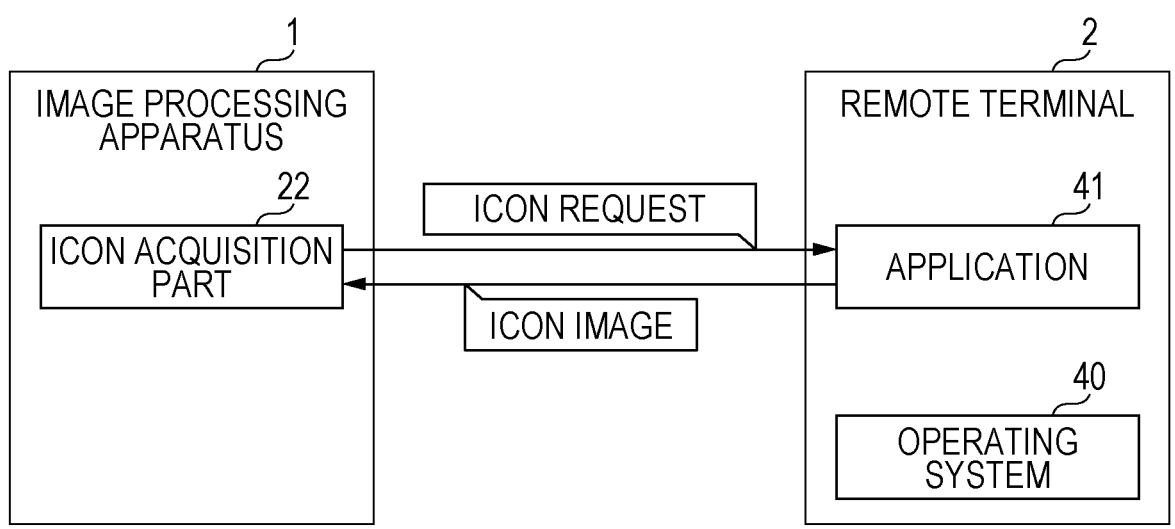

FIGS. 17A and 17B are diagrams illustrating exemplary communication of the icon acquisition part 22 with the remote terminal 2. FIG. 17A illustrates a case where the icon acquisition part 22 communicates with an operating system 40 of the remote terminal 2. When the operating system 40 of the remote terminal 2 manages icon images corresponding to various file formats, the icon acquisition part 22 accesses the operating system 40 of the remote terminal 2 as illustrated in FIG. 17A, and transmits a request for icon images to an application programming interface (API) of the operating system 40, so as to obtain an icon image corresponding to a specific file format from the plurality of icon images managed by the operating system 40. That is, in this case, the icon acquisition part 22 can obtain the icon image directly from the operating system 40 of the remote terminal 2. With this configuration, the icon acquisition part 22 can obtain an icon image from the remote terminal 2 even when the application is not running on the remote terminal 2.

FIG. 17B illustrates a case where the icon acquisition part 22 communicates with an application 41 operating on the remote terminal 2. When the application 41 running on the remote terminal 2 manages icon images corresponding to various file formats, the icon acquisition part 22 transmits, to the application 41 running on the remote terminal 2, a request for an icon image, and obtains an icon image managed by the application 41 as illustrated in FIG. 17B. Therefore, in this case, the image processing apparatus 1 can obtain the icon image from the remote terminal 2 via the application 41 even in a case where the operating system 40 does not include an API for transmitting the icon image.

In the first to fifth embodiments described above, any of the communication modes illustrated in FIGS. 17A and 17B may be adopted.

(Modification)

While several embodiments related to the present invention have been described above, the present invention is not limited to the description in the above embodiment, and various modifications are applicable.

For example, the above-described embodiment is a case where the image processing apparatus 1 is provided as an MFP or the like having a copy function, a scan function, a print function, or the like. The image processing apparatus 1, however, is not limited to the device having a copy function, a scan function, a print function, or the like, such as an MFP. That is, the image processing apparatus 1 may be any apparatus that is capable of executing at least one type of image processing involving file format conversion.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus capable of performing image processing by communicating with a remote terminal, the image processing apparatus comprising:
a communication part that communicates with the remote terminal;
a display part; and
a hardware processor that:
is capable of obtaining a file having a first file type corresponding to a first icon image, the file being a file as an image processing target;
is capable of performing image processing involving file type conversion of the obtained file;
obtains a second icon image corresponding to a second file type of a file after undergoing processing generated by the image processing, from the remote terminal;
causes the display part to display the second icon image obtained by the hardware processor, for the file after undergoing processing;
obtains the first icon image corresponding to the first file type of a file before undergoing processing as an image processing target from the remote terminal; and
displays the file as the image processing target using the first icon image obtained by the hardware processor simultaneously with display of the second icon image, wherein
the first file type is different from the second file type, and
the first icon image is different from the second icon image.

2. The image processing apparatus according to claim 1, wherein the hardware processor further determines image processing to be performed by the hardware processor from among a plurality of types of image processing,
before image processing is determined by the hardware processor,
obtains a plurality of icon images from the remote terminal, and
after image processing has been determined by the hardware processor,
selects the second icon image corresponding to the file type of the file after undergoing processing generated by the image processing from among the plurality of icon images and displays the selected icon image.

3. The image processing apparatus according to claim 2, wherein the hardware processor obtains an icon image corresponding to a file type of a file that can be generated by each of the plurality of types of image processing.

4. The image processing apparatus according to claim 1, wherein when a file before undergoing processing as an image processing target is selected in the hardware processor, the hardware processor specifies a file type of the file that can be generated by the image processing in accordance with the file type of the file before undergoing processing, and obtains an icon image corresponding to the file type of the file.

5. The image processing apparatus according to claim 1, wherein the hardware processor further determines image processing to be performed by the hardware processor from among a plurality of types of image processing, and
after image processing has been determined by the hardware processor, obtains the second icon image corresponding to the file type of the file after undergoing processing generated by the image processing.

6. The image processing apparatus according to claim 1, further comprising a storage that stores an icon image corresponding to a file type of a file to be generated by the image processing,
wherein in a case where the hardware processor cannot obtain the second icon image corresponding to the file type of the file after undergoing processing to be generated by the image processing, the hardware processor displays the file to be generated by the image processing using the icon image stored in the storage.

7. The image processing apparatus according to claim 1, wherein the communication part is capable of communicating with each of a first remote terminal and a second remote terminal, and
the hardware processor obtains a file before undergoing processing as the image processing target from the first remote terminal, outputs a file generated by performing the image processing on the file before undergoing processing to the second remote terminal,
obtains, from the first remote terminal, the first icon image corresponding to the file type of the file before undergoing processing as the image processing target and the second icon image corresponding to the file type of the file after undergoing processing generated by the image processing, and transmits the second icon image to the second remote terminal.

8. The image processing apparatus according to claim 1, wherein the communication part is capable of communicating with each of a first remote terminal and a second remote terminal, and
the hardware processor obtains a file before undergoing processing as the image processing target from the first remote terminal, outputs the file generated by performing the image processing on the file before undergoing processing, to the second remote terminal,
the hardware processor obtains, from the first remote terminal, the first icon image corresponding to the file type of the file before undergoing processing as the image processing target, and obtains the second icon image corresponding to the file type of the file after undergoing processing generated by the image processing, from the second remote terminal.

9. The image processing apparatus according to claim 1, wherein when displaying a file list screen on the display part, the hardware processor controls to display a file included in the file list screen and being a file of a same file type as the file after undergoing processing generated by the image processing, using the second icon image obtained by the hardware processor.

10. The image processing apparatus according to claim 1, wherein the hardware processor obtains an icon image managed by an application running on the remote terminal by communicating with the application via the communication part.

11. The image processing apparatus according to claim 1, wherein the hardware processor obtains an icon image managed by an operating system of the remote terminal by communicating with the operating system via the communication part.

12. A non-transitory recording medium storing a computer readable program executed by an image processing apparatus including a display part and capable of performing image processing involving file type conversion, the program being provided to cause a hardware processor of the image processing apparatus to execute:
obtaining a file having a first file type corresponding to the first icon image, being a file as an image processing target;
performing an image processing involving file type conversion of the obtained file;
obtaining a second icon image corresponding to a second file type of a file after undergoing processing generated by the image processing, from the remote terminal; and
causing the display part to display the second icon image obtained from the remote terminal, for the file after undergoing processing, wherein
in the obtaining the second icon image, the first icon image corresponding to the first file type of a file before undergoing processing as the image processing target is further obtained from the remote terminal,
in the causing the display part to display the second icon image, the file as the image processing target is displayed using the first icon image obtained in the obtaining the second icon image simultaneously with display of the second icon image,
the first file type is different from the second file type, and the first icon image is different from the second icon image.

13. The non-transitory recording medium storing a computer readable program, according to claim 12,
the program causing the hardware processor to further execute determining image processing to be performed from among a plurality of types of image processing,
wherein before the image processing is determined in the determining,
a plurality of icon images is obtained from the remote terminal in the obtaining a second icon image, and
after image processing has been determined in the determining,
the second icon image corresponding to the file type of the file after undergoing processing generated by the image processing is selected from among the plurality of icon images and displayed, in the causing the display part to display the second icon image.

14. The non-transitory recording medium storing a computer readable program, according to claim 13,
wherein, in the obtaining a second icon image, an icon image corresponding to a file type of a file that can be generated by each of the plurality of types of image processing is obtained.

15. The non-transitory recording medium storing a computer readable program, according to claim 12,
wherein when the file before undergoing processing to be the image processing target is selected, in the obtaining a second icon image, a file type of the file that can be generated by the image processing is specified in accordance with the file type of the file before undergoing processing, and an icon image corresponding to the file type of the file is obtained.

16. The non-transitory recording medium storing a computer readable program, according to claim 12, the program further causing the hardware processor to execute determining image processing to be performed from among a plurality of types of image processing,
wherein after image processing has been determined in the determining, in the obtaining a second icon image, the second icon image corresponding to the file type of the file after undergoing processing generated by the image processing is obtained.

17. The non-transitory recording medium storing a computer readable program, according to claim 12,
wherein the image processing apparatus includes a storage that stores an icon image corresponding to a file type of a file generated by the image processing, and
in a case where, in the obtaining a second icon image, the second icon image corresponding to the file type of the file after undergoing processing generated by the image processing cannot be obtained, the file generated by the image processing is displayed using the icon image stored in the storage in the causing the display part to display the second icon image.

18. The non-transitory recording medium storing a computer readable program, according to claim 12,
wherein, in the obtaining a file, communication with each of the first remote terminal and the second remote terminal is performed, a file before undergoing processing as the image processing target is obtained from the first remote terminal, and the file generated by performing the image processing on the file before undergoing processing is output to the second remote terminal, and
in the obtaining a second icon image, the first icon image corresponding to the file type of the file before undergoing processing as the image processing target and the second icon image corresponding to the file type of the file after undergoing processing generated in the image processing are obtained from the first remote terminal, and the second icon image is transmitted to the second remote terminal.

19. The non-transitory recording medium storing a computer readable program, according to claim 12,
    wherein, in the obtaining a file, communication with each of the first remote terminal and the second remote terminal is performed, a file before undergoing processing as the image processing target is obtained from the first remote terminal, and the file generated by performing the image processing on the file before undergoing processing is output to the second remote terminal, and
    in the obtaining a second icon image, the first icon image corresponding to the file type of the file before undergoing processing as the image processing target is obtained from the first remote terminal, and the second icon image corresponding to the file type of the file after undergoing processing generated by the image processing is obtained from the second remote terminal.

20. The non-transitory recording medium storing a computer readable program, according to claim 12,
    wherein when displaying a file list screen on the display part, a file included in the file list screen and being a file of a same file type as the file after undergoing processing generated in the image processing is displayed in the causing the display part to display the second icon image, using the second icon image obtained in the obtaining a second icon image.

21. The non-transitory recording medium storing a computer readable program, according to claim 12,
    wherein, in the obtaining a second icon image, an icon image managed by an application running on the remote terminal is obtained by communicating with the application.

22. The non-transitory recording medium storing a computer readable program, according to claim 12,
    wherein, in the obtaining a second icon image, an icon image managed by an operating system of the remote terminal is obtained by communicating with the operating system.

* * * * *